US009804811B2

(12) United States Patent
Wong

(10) Patent No.: US 9,804,811 B2
(45) Date of Patent: Oct. 31, 2017

(54) SYSTEM AND METHOD FOR PRINTING LOCATION-BASED, CUSTOMIZED DATA

(71) Applicant: KYOCERA Document Solutions Inc., Osaka (JP)

(72) Inventor: Gregory H. Wong, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/087,635

(22) Filed: Mar. 31, 2016

(65) Prior Publication Data

US 2017/0286036 A1 Oct. 5, 2017

(51) Int. Cl.
*G06F 3/12* (2006.01)
*H04W 4/02* (2009.01)

(52) U.S. Cl.
CPC .......... *G06F 3/1292* (2013.01); *G06F 3/1204* (2013.01); *G06F 3/1236* (2013.01); *H04W 4/023* (2013.01); *H04M 2250/02* (2013.01); *H04M 2250/10* (2013.01)

(58) Field of Classification Search
None
See application file for complete search history.

(56) References Cited

U.S. PATENT DOCUMENTS

| | | | |
|---|---|---|---|
| 8,478,289 B1* | 7/2013 | Lookingbill | H04W 16/22 455/2.01 |
| 8,718,620 B2 | 5/2014 | Rosenblatt | |
| 8,990,556 B1 | 3/2015 | Wurster et al. | |
| 9,361,794 B1* | 6/2016 | Lynch | G08G 1/00 |
| 2002/0038612 A1* | 4/2002 | Iwazaki | H04N 1/00127 101/484 |
| 2007/0281689 A1* | 12/2007 | Altman | G06Q 30/0207 455/435.1 |
| 2008/0200153 A1* | 8/2008 | Fitzpatrick | G06F 17/30867 455/414.1 |
| 2008/0248815 A1* | 10/2008 | Busch | H04W 4/02 455/456.5 |
| 2008/0313037 A1* | 12/2008 | Root | G06Q 30/02 705/14.53 |

(Continued)

FOREIGN PATENT DOCUMENTS

WO 2014124313 A1 8/2014

*Primary Examiner* — Ming Hon
(74) *Attorney, Agent, or Firm* — McDonnell Boehnen Hulbert & Berghoff LLP

(57) ABSTRACT

The present disclosure is directed to a printing system. The printing system includes a geographic location server on a network that has access to a geographic location database. The printing system also includes a user profile server that has access to a user profile database. The printing system also includes a mobile client device that can communicate with the geographic location server and the user profile server and is associated with a user profile included in the user profile database. The geographic location server and the user profile server cooperatively provide print data when the mobile client device is within a threshold distance of a geographic position of one geographic location stored within the geographic location database. The print data is based on one location-based artifact of the geographic location and user profile data, and is printed by a printing device.

20 Claims, 17 Drawing Sheets

(56) References Cited

U.S. PATENT DOCUMENTS

| | | | |
|---|---|---|---|
| 2010/0332338 A1* | 12/2010 | Burnett | G06Q 30/0601 705/26.61 |
| 2012/0130796 A1* | 5/2012 | Busch | G06Q 30/02 705/14.36 |
| 2012/0250074 A1* | 10/2012 | Kamppari | G06F 3/1204 358/1.15 |
| 2013/0102283 A1* | 4/2013 | Lau | H04W 12/06 455/411 |
| 2013/0103461 A1* | 4/2013 | Bhatia | G06Q 30/0207 705/14.1 |
| 2013/0124186 A1* | 5/2013 | Donabedian | G06F 17/289 704/2 |
| 2013/0337838 A1* | 12/2013 | Kolodziej | G06F 17/3087 455/456.3 |
| 2014/0006129 A1* | 1/2014 | Heath | G06Q 30/0222 705/14.23 |
| 2014/0113674 A1* | 4/2014 | Joseph et al. | H04W 4/021 455/519 |
| 2014/0118769 A1* | 5/2014 | Adachi et al. | G06F 3/1211 358/1.13 |
| 2014/0191868 A1 | 7/2014 | Ortiz et al. | |
| 2014/0220883 A1 | 8/2014 | Emigh et al. | |
| 2014/0254466 A1 | 9/2014 | Wurster et al. | |
| 2014/0375421 A1 | 12/2014 | Morrison et al. | |
| 2015/0014413 A1 | 1/2015 | Priebatsch | |
| 2015/0095402 A1 | 4/2015 | Fraccaroli | |
| 2015/0106395 A1 | 4/2015 | Stafira et al. | |
| 2015/0112790 A1* | 4/2015 | Wolinsky et al. | G06Q 30/0238 705/14.38 |
| 2015/0248702 A1* | 9/2015 | Chatterton | G06Q 30/0261 705/14.58 |
| 2015/0286452 A1* | 10/2015 | Kim et al. | G06F 3/1209 358/1.13 |
| 2015/0332325 A1* | 11/2015 | Sharma et al. | G06Q 30/02 705/14.57 |
| 2016/0105764 A1* | 4/2016 | Evans et al. | G08B 21/24 340/539.13 |
| 2016/0105788 A1* | 4/2016 | Helms et al. | H04W 8/005 455/41.2 |
| 2016/0241728 A1* | 8/2016 | Naruse | H04N 1/00347 |
| 2016/0321702 A1* | 11/2016 | Lerman et al. | G06Q 30/0267 |

\* cited by examiner

Places Database

| | places.id.1 | places.id.2 | places.id.3 |
|---|---|---|---|
| Places ID | 512 | | |
| Location GPS Coordinates | 42.8913N, 85.8068W | 42.8924N, 85.8068W | 42.8911N, 85.8051W |
| Location Description | Monkey Exhibit | Elephant Exhibit | Lion Exhibit |
| Viewing Duration Times (H, M, L) | (47m, 28m, 7m) | (66m, 56m, 25m) | (45m, 33m, 18m) |
| Capacity (Seats, Standing, Aisles) | (200, 100, 20) | (100, 400, 50) | (0, 500, 0) |
| Popularity Ranking | 8.9 | 3.4 | 7.7 |
| Messages Pointers | &message.pointer.1 | &message.pointer.2 | &message.pointer.3 |
| Content Pointers | &content.pointer.1 | &content.pointer.2 | &content.pointer.3 |
| Peak Calendar | June | June | June |
| Scheduled Demos | 1:00pm, 3:30pm | 3:30pm | 11:00am, 1:30pm |
| Special Staffing, Guest Speakers | None | Visiting Professor | None |
| Featured Ranking | 5 | 3 | 7 |
| Special Peak Message | $5 Off Merchandise | Free Elephant Hat | None |
| Priority | High | Medium | Medium |
| Constraints | None | Closes 1 hour early | None |

Venue Maps Database (212, 602)

| | | | |
|---|---|---|---|
| 612 → Location | ZooTown Zoo | ZooTown Zoo | Hospital |
| 614 → Building | Gift Shop | Lion Exhibit | Oncology |
| 616 → Floor | 1st Floor | N/A | 5th Floor |
| 618 → Section | T-shirt Sales | N/A | East Wing |
| 620 → Walkways (N/S, E/W, other) | (,Zootown.routes.13,) | (,Zootown.routes.10,,) | (,Hosp.routes.142,) |
| 622 → Grid (Start, End) | (142-156, 148-165) | (101-43, 160-85) | (25-44, 44-176) |
| 624 → Messages Pointers | &message.pointer.19 | &message.pointer.72 | &message.pointer.95 |
| 626 → Content Pointers | &content.pointer.71 | &content.pointer.68 | &content.pointer.14 |
| 628 → Walkway Capacity | Low | High | Medium |
| 630 → Demos Blocking Aisle | Buy one, get one free | Endangered Species | N/A |
| 632 → Special Delays | N/A | Lion cubs born today | Visitations at 7:00PM |
| 634 → Peak Calendar | December | June | December |
| 636 → Seasonal Display? | N/A | "It's Lion Month!" | Treatment Options |
| 638 → Priority | High | Medium | High |
| 640 → Constraints | Map only valid 1-5pm | None | New wing not on map |

Geographic Location Database 252 → / 802 →

| | | | |
|---|---|---|---|
| 812 → Beacon/GeoFence ID | ZooTownLocus.5 | ZooTownLocus.6 | ZooTownLocus.7 |
| 814 → Location GPS Coordinates | 45.7495W, 87.5489N | 45.7498W, 87.5474N | 45.7489W, 87.5459N |
| 816 → Location Description | Camel Exhibit | Sea Otter Exhibit | Panda Exhibit |
| 818 → Range Setting | 40m | 5m | 20m |
| 820 → Viewing Duration Times (H, M, L) | (44m, 31m, 9m) | (91m, 72m, 30m) | (75m, 42m, 17m) |
| 822 → Capacity (by range: far, near) | (300, 250, 150) | (200, 100, 10) | (800, 400, 200) |
| 824 → Popularity Ranking | 16 out of 18 | 4 out of 18 | 5 out of 18 |
| 826 → Message Pointers | &message.pointer.41 | &message.pointer.43 | &message.pointer.47 |
| 828 → Content Pointers | &content.pointer.77 | &content.pointer.51 | &content.pointer.53 |
| 830 → Peak Calendar | May | June | June |
| 832 → Scheduled Demos | Rides at 3:00PM | Feeding at 11:00AM | Feeding at 2:00PM |
| 834 → Special Staffing, Guest Speakers | None | None | Panda Professor |
| 836 → Featured Ranking | 18 out of 18 | 5 out of 18 | 1 out of 18 |
| 838 → Seasonal Display | None | None | None |
| 840 → Priority | Low | High | Medium |
| 842 → Constraints | None | None | Closed in August |

Figure 8

Figure 9

| User Profile Database | | | |
|---|---|---|---|
| User ID | TigerFan01 | MonkeyMan1977 | I_am_SalmonSam |
| User GPS Coordinates | 45.7495W,87.5489N | 45.7493W,87.5489N | 45.7499W,87.5481N |
| Mobile Device ID | 192.168.1.844 | 192.168.1.841 | 192.168.1.187 |
| Range Setting | 2.5m | 2m | 3m |
| Duration Times (H, M, L) | (45min,32min,12min) | (49min,17min,6min) | (62min,49min,23min) |
| Places Prioritized List | link_to_tigerfan_list | None | None |
| Popularity Ranking | 17 out of 122 | 6 out of 122 | 109 out of 122 |
| If Busy, Then What? | Send text message | Nothing | Send email |
| Broadcast Messages | "Tigers are grrreat!" | "I like monkeys!" | "Salmon Sam, I am" |
| Scheduled Demos | Tiger feeding at 2pm | None | None |
| Special Requests (For Speakers) | Speak slower | None | Speak louder |
| Priority | High | Medium | Low |
| Constraints | Child user privileges | None | WiFi connection only |
| Languages | English | English, Spanish | English, French |
| Disabilities | Nearly deaf | None | In a wheelchair |

Figure 10

Traffic and Capacity Database (242) — 1002

| | Places ID | ZooTownPlaces.id.12 | ZooTownPlaces.id.13 | ZooTownPlaces.id.19 |
|---|---|---|---|---|
| 1012 | Places ID | ZooTownPlaces.id.12 | ZooTownPlaces.id.13 | ZooTownPlaces.id.19 |
| 1014 | Location GPS Coordinates | 45.7498W, 87.5499N | 45.7491W, 87.5499N | 45.7478W, 87.5472N |
| 1016 | Location Description | Walrus Exhibit | Penguin Exhibit | Koala Exhibit |
| 1018 | Range Setting | 10m | 5m | 8m |
| 1020 | Traffic Duration Times (H, M, L) | (41min, 22min, 12min) | (82min, 43min, 31min) | (59min, 37min, 19min) |
| 1022 | Capacity (Seats, Standing, Aisles) | (20, 200, 10) | (200, 100, 100) | (0, 200, 20) |
| 1024 | Popularity Ranking | 15 of 18 | 3 of 18 | 2 of 18 |
| 1026 | Message Pointers | &message.pointer.14 | &message.pointer.33 | &message.pointer.36 |
| 1028 | Content Pointers | &content.pointer.8 | &content.pointer.97 | &content.pointer.81 |
| 1030 | Peak Calendar | September | June | June |
| 1032 | Scheduled Demos | Feeding at 9:00AM | Feeding at 3:00PM | Feeding at 1:00PM |
| 1034 | Special Staffing, Guest Speakers | None | Penguin Expert | Koala Breeder |
| 1036 | Featured Ranking | 3 of 18 | 12 of 18 | 2 of 18 |
| 1038 | Seasonal Display | None | Christmas in July! | None |
| 1040 | Priority | Low | High | High |
| 1042 | Constraints | None | If >300 people, close | None |

Message Transmission Table 1200 / 1202

| | | Auto Showroom | Zoo | Zoo | |
|---|---|---|---|---|---|
| Location Info | Venue | | | | |
| | Location | 6-Cylinder Exhibit | Salmon Exhibit | Kangaroo Exhibit | ← 1212 |
| | Major Location | Future Cars Exhibit | The Americas Exhibit | Australian Exhibit | ← 1214 |
| | Minor Location | Sports Cars Exhibit | Northern Fish Exhibit | None | ← 1216 |
| Distance Info | Distance - Far | "VRRROOOMMM!" | "Swim Right Up!" | "Hop on Up!" | ← 1218 |
| | Distance - Near | Pamphlet | salmon_link.com | kangaroo_link.com | ← 1220 |
| | Distance - Immediate | Advertising Video | "Don't feed the fish!" | "Watch out, he kicks!" | ← 1222 |
| | Distance – Exiting Region | "On sale in fall 2017" | "Thanks for visiting!" | "Thanks for visiting!" | ← 1224 |
| Push Notification Info | Push Notifications - Low | Car Webpage | Taxonomic Name | Taxonomic Name | ← 1226 |
| | Push Notifications - Mid | Car Webpage | Salmon Picture | Kangaroo Picture | ← 1228 |
| | Push Notifications - High | Car Webpage | Name and Picture | Name and Picture | ← 1230 |
| | Push Notifications Popup? | No | Yes | Yes | ← 1232 |

Figure 12

SYSTEM AND METHOD FOR PRINTING LOCATION-BASED, CUSTOMIZED DATA

BACKGROUND

Unless otherwise indicated herein, the materials described in this section are not prior art to the claims in this application and are not admitted to be prior art by inclusion in this section.

Mobile client devices, such as cellular phones, smart phones, and tablets, can be used to track a user's location. This location tracking frequently occurs using the coordinates obtained through the global positioning system (GPS). As an example, a mobile client device may plot a route from point A to point B using a map, track progress along the route by tracking the location using GPS coordinates, and provide directional navigation guidance depending on the progress along the route (e.g., a directional arrow that overlays a route on a user interface).

Where a very precise relative location is required, a mobile client device may communicate with proximity beacons placed within the environment, such as a Bluetooth® low energy (BLE) beacons. This communication can be used by a mobile client device to determine its proximity to the proximity beacon. Such beacons can be used alone or in concert with GPS coordinates to aid a mobile client device in performing such tasks as tracking the location of a lost item, displaying an alert when something important is nearby, or tracking a user's location.

Sometimes, when a user is at a venue, such as a concert, sports stadium, park, zoo, museum, theme park, etc., their experience would be enhanced if they were provided personalized content at certain geographic locations within the venue, real-time updates of activity within the venue, dynamic content about various geographic locations within the venue that is recorded by other patrons or monitoring devices within the venue, or the ability to retain images of gathered information throughout their traversal of the venue.

SUMMARY

The application discloses embodiments that relate to systems and methods for printing location-based, customized data.

In one aspect, the present disclosure describes a printing system. The printing system includes a printing device. The printing system also includes a geographic location server on a network that has access to a geographic location database. The geographic location database includes geographic location data associated with one or more geographic locations. The geographic location data associated with each of the one or more geographic locations includes at least a corresponding geographic position and one location-based artifact. The printing system also includes a user profile server located on the network that has access to a user profile database. The user profile database includes user profile data associated with a plurality of user profiles. The printing system also includes a mobile client device that has access to the network and is associated with one of the plurality of user profiles. The mobile client device has instructions stored thereon to cause the mobile client device to communicate with the printing device, the geographic location server, and the user profile server. The mobile client device is also configured to determine when the mobile client device is within a threshold distance of one or more geographic positions corresponding to one or more geographic locations. The geographic location server and the user profile server cooperatively provide print data when the mobile client device determines that the mobile client device is within a first threshold distance of the respective corresponding geographic position of one of the geographic locations. The print data is derived based on at least one of the at least one location-based artifacts of the respective one of the geographic locations as well as the user profile data of the user profile associated with the mobile client device. The print data is transmitted to the printing device and printed by the printing device.

In another aspect, the present disclosure describes a method for printing customized location based content. The method includes receiving a transmission from a mobile client device when the mobile client device determines that the mobile client device is within a first threshold distance of a geographic position corresponding to a respective geographic location. The mobile client device has access to a network and is associated with one of a plurality of user profiles. The mobile client device also has instructions stored thereon to cause the mobile client device to communicate with a printing device, a geographic location server, and a user profile server. The geographic location server is on the network and has access to a geographic location database. The geographic location database includes geographic location data associated with one or more geographic locations. The geographic location data associated with one or more geographic locations includes at least a corresponding geographic position and one location-based artifact. The user profile server is located on the network and has access to a user profile database. The user profile database includes user profile data associated with the plurality of user profiles. The method further includes providing print data by the user profile server and the geographic location server cooperatively. The print data is derived from at least one of the at least one location-based artifacts of the respective geographic location as well as the user profile data of the user profile associated with the mobile client device. The method additionally includes printing, by the printing device, the provided print data.

In a third aspect, the present disclosure describes a mobile client device. The mobile client device includes a network interface. The network interface is configured to communicate with a printing device. The network interface is also configured to communicate with a geographic location server located on a network. The geographic location server has access to a geographic location database. The geographic location database includes geographic location data associated with one or more geographic locations. The geographic location data associated with each of the one or more geographic locations includes at least a corresponding geographic position and one location-based artifact. The network interface is further configured to communicate with a user profile server located on the network. The user profile server has access to a user profile database. The user profile database includes user profile data associated with a plurality of user profiles. The mobile client device also includes a memory with instructions stored thereon. Further, the mobile client device includes a processing device. When the processing device executes the instructions, the processing device causes the mobile client device to communicate with the printing device, the geographic location server, and the user profile server. The processing device also causes the mobile client device to determine when the mobile client device is within a threshold distance of one or more geographic positions corresponding to one or more geographic locations. The geographic location server and the user profile server cooperatively provide print data when the mobile client device determines that the mobile client device is within a first threshold distance of the respective corresponding geographic position of one of the geographic locations. The print data is derived based on at least one of the at least one location-based artifacts of the respective one of the geographic locations as well as the user profile data of the user profile associated with the mobile client device. The print data is also transmitted to the printing device and printed by the printing device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is an illustration of a database, according to example embodiments.

FIG. 6 is an illustration of another database, according to example embodiments.

FIG. 8 is an illustration of another database, according to example embodiments.

FIG. 9 is an illustration of another database, according to example embodiments.

FIG. 10 is an illustration of another database, according to example embodiments.

FIG. 12 is an illustration of a table, according to example embodiments.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. OVERVIEW

Example embodiments include a system that is configured to print customized print data based on at least one location-based artifact associated with a geographic location and user profile data of a user profile that is associated with a mobile client device. The system includes a mobile client device, a geographic location server that has access to a geographic location database, a user profile server that has access to a user profile database, at least one mobile client device, and at least one printing device.

The mobile client device is associated with one or more user profiles that are included in the user profile database. The mobile client device is configured to determine when the mobile client device is within a threshold distance of a geographic position that is associated with one or more geographic locations that are included in the geographic location database.

In one embodiment, the mobile client device executes instructions, using a processor, that are stored within a memory to monitor whether the mobile client device comes within a threshold distance of geographic positions corresponding to geographic locations that are stored within the geographic location database.

When the mobile client device determines that the mobile client device has come within a threshold distance of one of the geographic positions, the mobile client device may transmit an alert to a managing server to indicate that the mobile client device is within a threshold distance of one of the geographic positions. The managing server may then retrieve information from the user profile database and the geographic location database (such as user profile information and location specific information), by communicating with the user profile server and the geographic location server.

The managing server may then transmit the information retrieved from the user profile database and the geographic location database to one of the printing devices in the form of print data. The printing device may then print a customized print page based on the print data received.

II. EXAMPLE EMBODIMENTS

Figure 1:
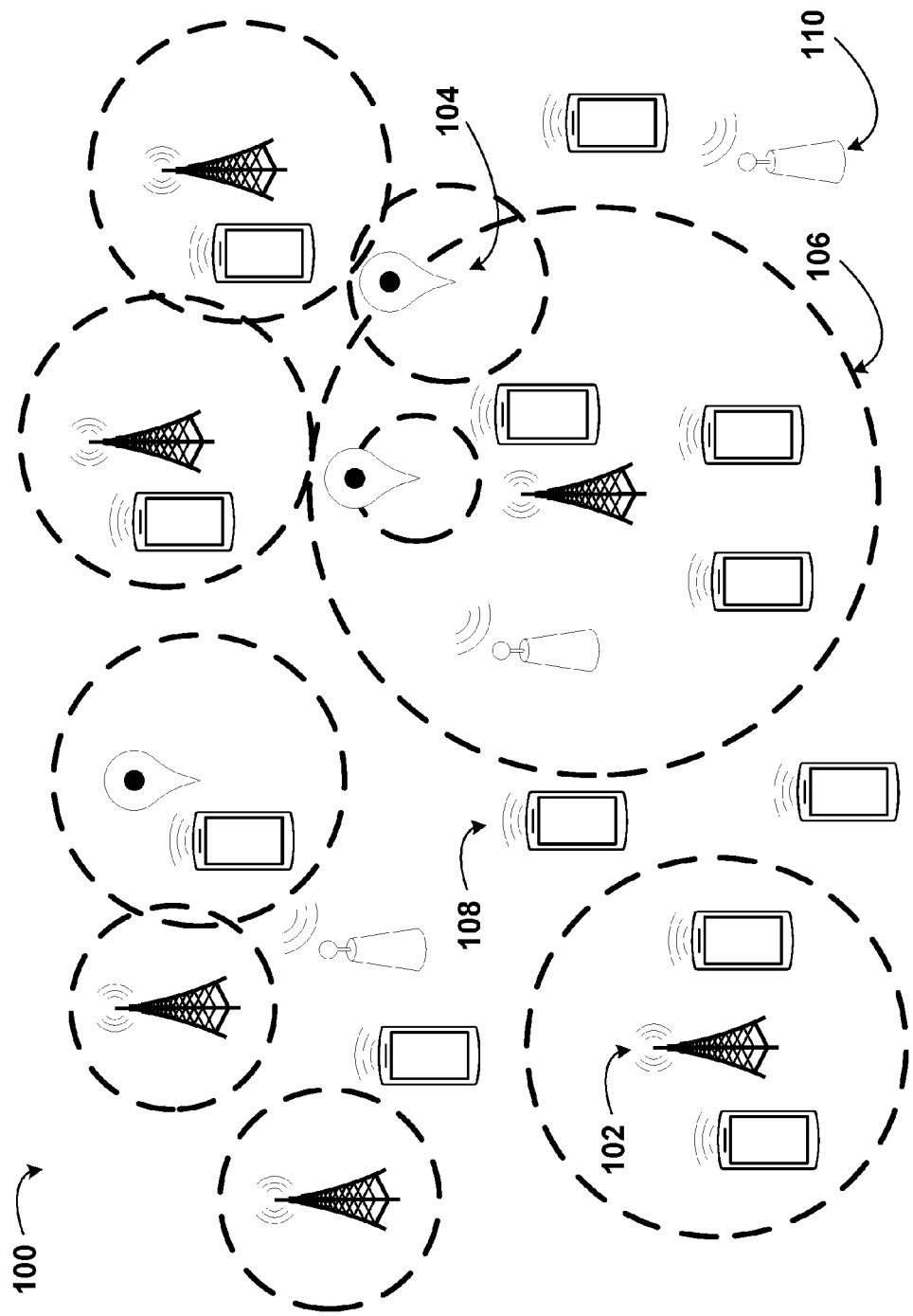
FIG. 1 is an illustration of a system, according to example embodiments.

FIG. 1 is an illustration of a system 100, according to example embodiments. The system 100 may include proximity beacons 102, GPS locations 104, geofences 106, mobile client devices 108, and population monitoring devices 110, and can be used to track mobile client devices 108 entering and exiting the geofences 106 associated with proximity beacons 102 or GPS locations 104 as well as the distribution of a specific population.

The proximity beacons 102 are devices which broadcast continuously. The proximity beacons 102 may be broadcasting identifiers that indicate information about the proximity beacon 102, such as the geographic position of the beacon. These identifiers may be read by nearby mobile client devices 108.

An example technology that may be used as the proximity beacons 102, in some embodiments, is BLE beacons. When a compatible application or operating system, installed on a nearby mobile client device 108, receives the identifier, the application or operating system can perform various actions, such as establish the rough geographic location of the mobile client device 108, check-in on a social media network, display a push and/or popup notification, or, by analyzing the power of the BLE signal received from the beacon, establish the distance the mobile client device 108 is away from the BLE beacon.

Various transmitters may be employed as BLE beacons in various embodiments. Some example transmitters that may serve as BLE beacons include universal serial bus (USB) dongles attached to computing devices, small devices powered by button batteries, and mobile devices with Bluetooth® enabled that are set to transmit mode. Because Bluetooth® is a technology that is not power intensive, such BLE beacons can last for a substantial length of time (years) off of an internal battery without require external sources of power.

The GPS locations 104 are alternate ways of indicating prioritized geographic locations. The GPS locations 104 may be stored as a list of GPS coordinates within the mobile client devices 108 or within a server, in various embodiments.

In some embodiments, the GPS locations 104 may be waypoints for a route that the mobile client device 108 is traversing. Because the GPS locations 104 are not tied to physical emitters, they may be located anywhere that has a GPS position.

The proximity beacons 102 and/or the GPS locations 104 may correspond to certain areas of interest within the environment, such as bathrooms, gift shops, special sales, exhibits, etc. This may serve to indicate to the mobile client device 108 when areas of interest are nearby.

The geofences 106 are defined areas around the geographic locations (proximity beacons 102 and GPS locations 104) that serve as demarcations between a region that is sufficiently close to the respective proximity beacon 102 or GPS location 104 to constitute an action on the part of the mobile client device 108. In some embodiments, the geofences 106 will be indicated within the mobile client devices 108 solely based on their geographic positions relative to the respective proximity beacons 102 and GPS locations 104. However, in other embodiments, the geofences 106 may have physical indicators of their location.

The geofences 106 may overlap one another. In addition, one of the geofences 106 may entirely encapsulate another geofence 106, as in the example embodied system 100 of FIG. 1. This encapsulation may permit the mobile client device 108 to identify its current location with a higher resolution. For instance, a large geofence may indicate a region within a venue such as the food court, whereas an encapsulated geofence may indicate one of the restaurants located within the food court.

The geofences 106 may be circular in shape, thereby indicating equidistant points around the perimeter of the geographic region. Alternatively, though, the geofences 106 may be polygons having n sides. This may be the case in systems 100 where many geofences 106 are abutted next to one another, and are not permitted to overlap with one another. An example embodiment where this may occur could be in a mall where each of the geofences 106 represented a store and were used for advertising. A rule may exist that each store is not allowed to infringe on the advertising space of another store, so the geofences 106 may be precisely calibrated such that they occupy the maximum amount of geographic space over which to advertise to mobile client devices 108, but do not infringe on other store's geographic space.

In some embodiments, the geofences 106 may indicate the maximum distance a user of the mobile client device 104 can be from the in order to see and/or hear what is occurring at the geographic location associated with the respective proximity beacon 102 or GPS location 104 (e.g., a proximity beacon 102 corresponds to the geographic position of a piece of art in a museum, and the respective geofence 106 indicates the maximum distance a user may be from the piece of art while still being able to see it).

The geofences 106 may have subthreshold regions within the larger threshold region that may be used by the mobile client device 108 to prompt a different array of activities based on the subthreshold. For example, one geofence 106 may have three subthreshold regions within the geofence 106; one at 15 meters from a respective proximity beacon 102, one at 10 meters from the respective proximity beacon, and one at 5 meters from the respective proximity beacon 102. When the mobile client device 108 is within the 15 meter subthreshold, for instance, the mobile client device 108 vibrates. Then, when the mobile client device 108 is within the 10 meter subthreshold, the mobile client device 108 generates a push notification. Finally, when the mobile client device 108 is within the 5 meter subthreshold, the mobile client device 108 generates a popup notification.

Additionally, the mobile client device 108 may monitor in which order the subthreshold regions are crossed. For instance, if the 5 meter subthreshold is crossed and then the 10 meter subthreshold is crossed by the mobile client device 108, the mobile client device 108 may determine that the mobile client device 108 is leaving the respective geofence 106. This may prompt a supplemental response to be generated by the mobile client device 108, such as a popup notification stating, "thanks for visiting!" or providing a coupon via email that is redeemable by a customer upon the customer's return to the store associated with the respective geofence 106 for a future purchase.

The mobile client devices 108 are devices configured to monitor the location of one or more corresponding users with respect to the geographic position of proximity beacons 102, GPS locations 104, and geofences 106. The mobile client devices 108 may include components that permit communication with the proximity beacons 102. The mobile client devices 108 may also include components that attain the GPS location of the respective mobile client device 108.

Figure 2:
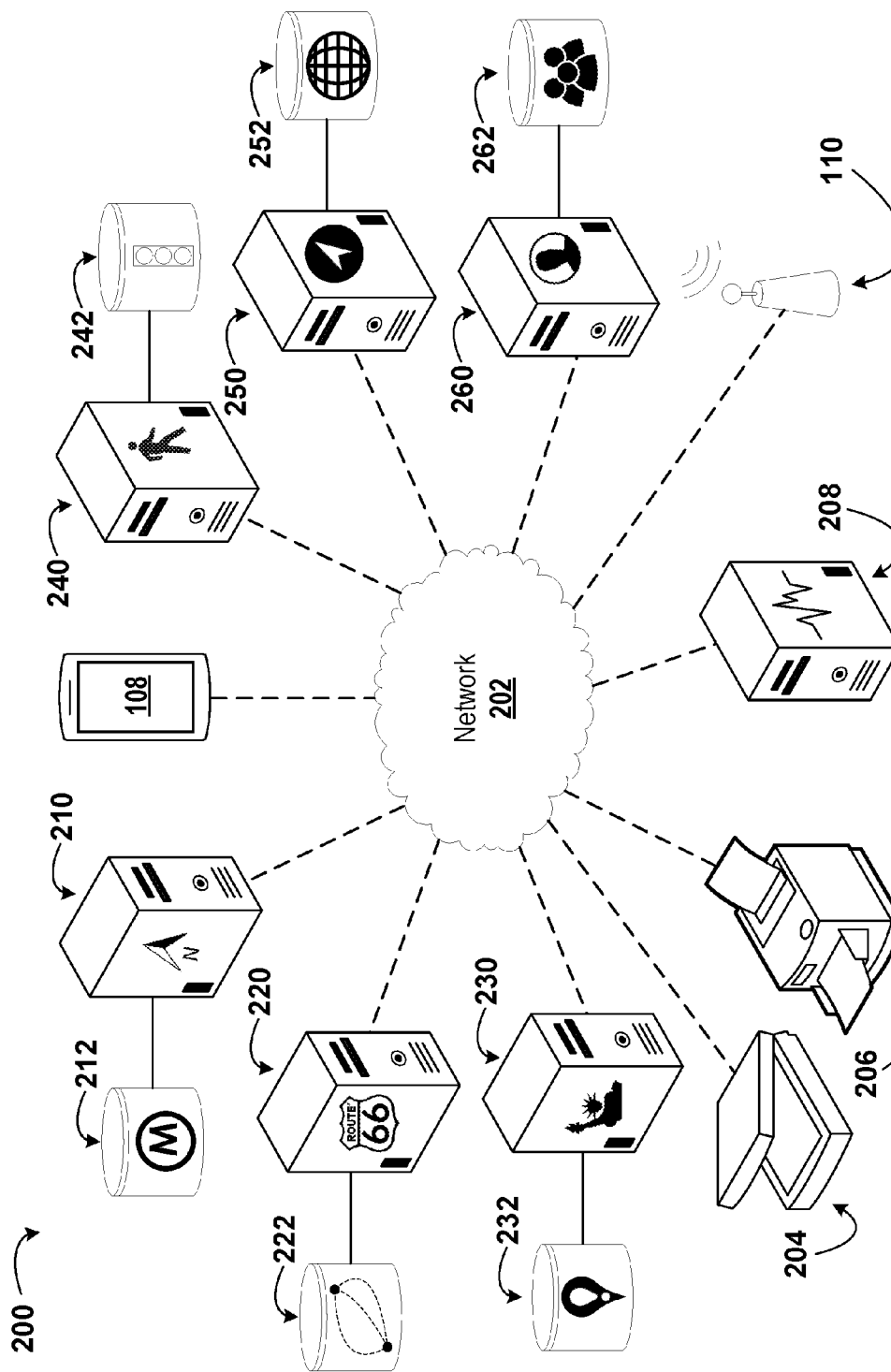
FIG. 2 is an illustration of another system, according to example embodiments.

The mobile client device 108 may be configured to transmit data over a network to other components (as described further in reference to FIG. 2). Additionally, the mobile client device 108 may be configured to communicate with the population monitoring devices 110.

The mobile client device 108 may, in certain embodiments, utilize an application to perform some or all of the tasks associated with the mobile client device 108. The application may be executed by a processing device and may allow the mobile client device 108 to receive user input, provide user feedback, and formulate messages to transmit to other system 100 components. The application may be downloaded and stored within a memory of the mobile client device 108. Alternatively, it may be stored on a remote server, such as a cloud server, and executed by the mobile client device 108 remotely, using a web-browser, for instance.

The mobile client device 108 may be additionally configured to perform other functions, partially or wholly unrelated to monitoring the geographic position of the mobile client device 108, such as placing phone calls, transmitting text messages to other mobile client devices, sending and/or receiving emails, browsing the Internet, etc. The mobile client device 108 may additionally be equipped with an onboard image recording device, such as a digital camera.

Figure 4:
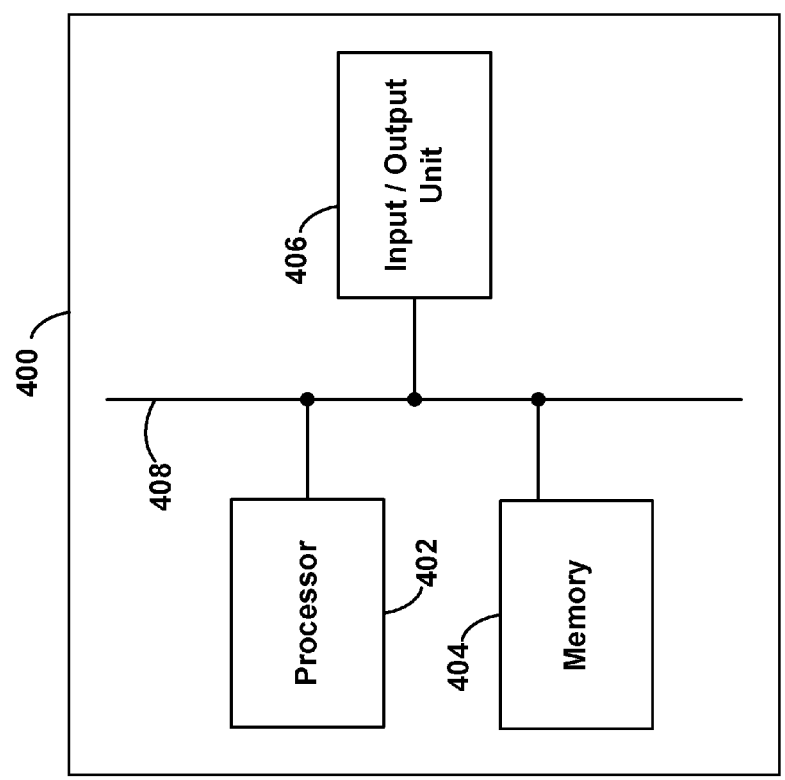
FIG. 4 is a schematic block diagram illustrating computing components of an image forming apparatus, a mobile client device, or a server, according to example embodiments.

Some of the potential computing components of the mobile client devices 108 are discussed further in reference to FIG. 4, please refer to that figure for further description.

The population monitoring devices 110 are configured to survey the environment to monitor the traffic population of people residing within different regions of the environment. In some embodiments, there may be one population monitoring device 110 assigned to an entire venue. In alternate embodiments, there may be multiple population monitoring devices 110 assigned to monitor distinct regions within a venue. In still other embodiments, there may be multiple population monitoring devices 110 assigned to monitor various aspects of the traffic population within the same region of a venue. The regions may be particular geofences 106, routes or paths between or among multiple geofences 106, or regions that contain multiple geofences 106.

In one example embodiment, the population monitoring devices 110 may be security cameras or traffic cameras that monitor how many people are within a certain space within the environment. The security cameras may include software that can use image analysis to determine how many people are within a specific region within an image. In certain embodiments, the population monitoring devices 110 may perform additional or alternative tasks unrelated to population monitoring, such as being controlled by an application on one or more of the mobile client devices 108 to record photos at various geographic locations. For example, an application on one of the mobile client devices 108 may control one of the population monitoring devices 110 to record an image of the corresponding user of the mobile client device 108 at a specific geographic location. This photo may later be purchased by the user or provided by the venue.

Alternatively, such as in a theme park, for example, the population monitoring devices 110 may take the form of turnstiles. Using the turnstiles, the population monitoring devices 110 could establish how much of the population within a venue is entering or exiting a certain region. In addition, the turnstiles may be used to determine the rate at which patrons are entering or exiting, thereby establishing a traffic flow rate. Similarly, in some embodiments, the population monitoring devices 110 may be tally counter devices designed to measure attendance inside a show room or track patrons passing a given geographic position.

In still further embodiments, the population monitoring devices 108 may be cellular towers or receivers that can monitor the geographic locations of the mobile client devices 108 within a venue. By monitoring the geographic locations of the geographic locations of the mobile client devices 108, the population monitoring devices 110 may establish the parts of the venue that have the highest population density. Additionally, the population monitoring devices 110 may monitor how the population density changes over time within different regions of the venue, thereby determining the traffic rate/density in various regions within the venue.

In addition to population density and traffic rate, the population monitoring devices 108 may also identify the demographics within a given population (i.e., age, sex, height, weight, hair color, eye color, nationality, ethnicity, attire, etc. of each patron). These demographics may be relayed to other devices so that they can be used to improve a venue's appeal or indicate to other patrons where similar or diverse groups of patrons may be congregating, for example.

As can be seen in FIG. 2, the population monitoring devices 110 may be connected to an array of servers/databases through a network. This permits the population monitoring devices 110 to relay the traffic/population information it retrieves to other devices for dissemination/use by those devices.

FIG. 2 is an illustration of a system according to example embodiments. The system in FIG. 2 enables a user to utilize information gathered by the system illustrated in FIG. 1. The system in FIG. 2, in various embodiments, may contain a subset of the following: a network 202, one or more of mobile client devices 108, one or more population monitoring devices 110, one or more scanners 204, one or more printers 206, a managing server 208, a venue maps server 210, a venue maps database 212, a routes between places server 220, a routes between places database 222, a places server 230, a places database 232, a traffic and capacity server 240, a traffic database 242, a geographic location server 250, a geographic location database 252, a user profile server 260, and a user profile database 262.

The network 202 provides a communication medium for the various components illustrated in FIG. 2. The network 202 may comprise multiple subnetworks that permit communication only between a subset of the components of FIG. 2 (e.g., a Bluetooth® connection between the mobile client device 108 and the scanner 204 may allow a communication medium between the two devices, but may not allow communication between the scanner 204 and the printer 206, for example).

The network 202 may be a local area network (LAN), provided by a router, in some embodiments. Connections to the router by the various components of FIG. 2 may be wireline (e.g. an Ethernet connection) or wireless (e.g. a Wi-Fi®, IEEE 802.11 standards, connection), in various embodiments. The LAN may serve a physical area the size of an entire venue, for example.

Alternatively, the network 202 may be an internet that spans a much wider physical area, such as the public Internet, for instance. If the public Internet served as the network 202, the servers 208, 210, 220, 230, 240, 250, 260 and databases 212, 222, 232, 242, 252, 262 could be located remotely (i.e., not within the venue where the proximity beacons 102, GPS locations 104, and geofences 106 are located).

The mobile client devices 108 and the population monitoring devices 110 are further defined with respect to FIG. 1; please see the description accompanying that figure for more information.

Figure 3:
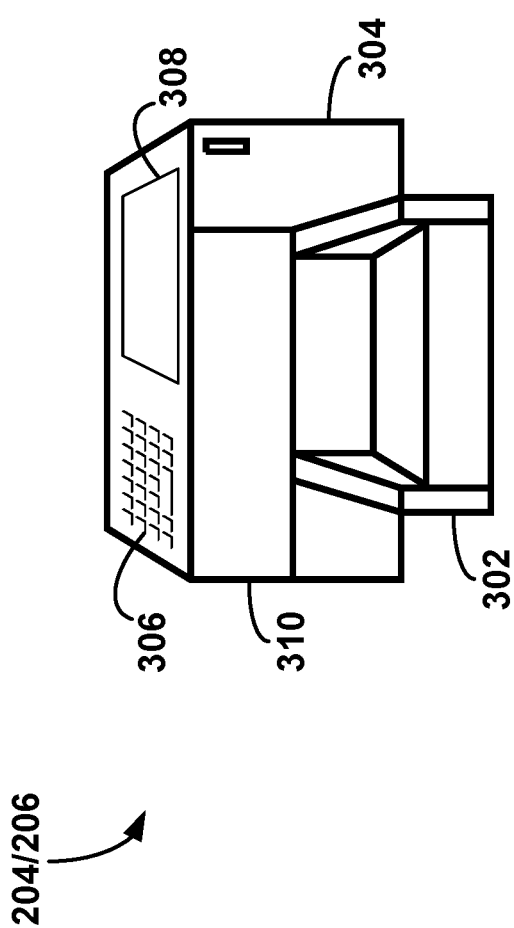
FIG. 3 is an illustration of an image forming apparatus, such as a printer or scanner, according to example embodiments.

The scanners 204 are defined with respect to FIGS. 3 and 4; please see the description accompanying those figures for more information.

The printers 206 are defined with respect to FIGS. 3 and 4, please see the description accompanying those figures for more information.

Some of the computing components that may comprise the following servers/databases are defined with respect to FIG. 4; please the description accompanying that figure for more information.

The managing server 208 may, in some embodiments, provide an engine for monitoring the real time activity of mobile client devices 108 and patrons within the system 100. Thus, the managing server 208 may retrieve information from the mobile client device(s) 108, the population monitoring devices 110, the various databases 212, 222, 232, 242, 252, 262, the scanner(s) 204, and the printer(s) 206, analyze the information, and provide output/feedback to the various devices. For instance, the managing server 208 may provide the mobile client device(s) 108 with status updates/notifications in response to information received from the mobile client device(s) 108 and the other devices in the system 200. As another example, the managing server 208 may transmit photos recorded by one of the mobile client devices 108 at a specific geographic location to other mobile client devices 108 located at the same geographic location. In this way, the system 200 allows for the sharing of multiple photos of the same geographic location that are recorded by multiple mobile client devices 108. The managing server 208 may also generate heat maps, routing maps, and customized print outs based on this information.

Alternatively, such items may be produced by other components within the system 200, sent to the managing server 208, and then transmitted by the managing server 208 to another destination. In this way, the managing server 208 serves to route information from different components within the system 200. For instance, information transmitted regarding the current state of the system 100 by the mobile client devices 108 or the population monitoring devices 110 may be transmitted to the managing server 208 for analysis and dissemination prior to the managing server 208 transmitting the information to other devices coupled to the network 202.

The managing server 208 may be a cloud server, in some embodiments. Furthermore, in some embodiments, the managing server 208 and the other servers 210, 220, 230, 240, 250, 260 may all be sub-servers of the same super-server. In still other embodiments, there may only be one server that satisfies the functions of all the servers 208, 210, 220, 230, 240, 250, 260 in FIG. 2.

In some embodiments, the servers 208, 210, 220, 230, 240, 250, 260 may communicate with one another and with other components of the system 200 using commands defined within a specialized programming language, such as Structured Query Language (SQL). Such languages may allow for the efficient retrieval of information within the related databases 212, 222, 232, 242, 252, 262.

Still further, in alternate embodiments, there may be no servers present. For instance, the databases 212, 222, 232, 242, 252, 262 may be stored within the mobile client device 108, and the mobile client device 108 may perform all the calculations necessary to output alerts and track the location of the mobile client device 108 within the system 100. In this way, the job of the managing server 208 and other corresponding servers 210, 220, 230, 240, 250, 260 may be performed wholly or partially by the mobile client device 108.

The venue maps server 210 serves to retrieve information included in the venue maps database 212. The venue maps server 210 and the venue maps database 212 may comprise a single computing device or may be spread across multiple computing devices, connected by a communication medium. The venue maps server 210 may respond to queries received from other devices in the system 200. In some embodiments, the venue maps server 210 may be a cloud server. The cloud server may require additional login credentials above those required for using the mobile client device(s) 108, the managing server 208, or any other device(s) in the system 200.

The venue maps database 212 stores information that pertains to a set of maps associated with one or more venues/locations. For example, a hospital may be a venue in which the system 100 of FIG. 1 is established to track the geographic locations of mobile client devices 108. Maps may be printed using the printer 206 or displayed on the mobile client devices 108 to aid in navigation by users of the mobile client devices 108. There may, in some embodiments, be a map of the entire hospital stored within the venue maps database 212. Additionally or alternatively, however, there may be maps of each individual floor or wing of the hospital stored within the venue maps database 212.

In addition to the map(s) themselves, there may be metadata about each map stored within the venue maps database 212. The information stored in the venue maps database 212 may be altered, deleted, added, or retrieved by the venue maps server 210, in various embodiments. An example embodiment of the venue maps database 212 is shown and defined further with respect to FIG. 6.

The routes between places server 220 serves to retrieve information included in the routes between places database 222. The routes between places server 220 and the routes between places database 222 may comprise a single computing device or may be spread across multiple computing devices, connected by a communication medium. The routes between places server 220 may respond to queries received from other devices in the system 200. In some embodiments, the routes between places server 220 may be a cloud server. The cloud server may require additional login credentials above those required for using the mobile client device(s) 108, the managing server 208, or any other device(s) in the system 200.

The routes between places database 222 stores information related to transit from one geographic location to another within one or more venues. In some venues, there may be more than one route from one geographic location to another, all of which may be included in the routes between places database 222. The metadata regarding routes contained within the routes between places database 222 may be used by the mobile client device(s) 108 and/or the managing server 208 to generate heat maps/routing maps. The information included in the routes between places database 222 may additionally be used by the mobile client device(s) 108 and/or the managing server 208 to find the most efficient route from the current geographic location of one of the mobile client devices 108 to a subsequent, desired geographic location.

The information stored in the routes between places database 222 may be altered, deleted, added, or retrieved by the routes between places server 220, in various embodiments. An example embodiment of the routes between places database 222 is shown and defined further with respect to FIG. 7. The places server 230 serves to retrieve information included in the places database 232. The places server 230 and the places database 232 may comprise a single computing device or may be spread across multiple computing devices, connected by a communication medium. The places server 230 may respond to queries received from other devices in the system 200. In some embodiments, the places server 230 may be a cloud server. The cloud server may require additional login credentials above those required for using the mobile client device(s) 108, the managing server 208, or any other device(s) in the system 200. For example, certain information stored in the routes between places database 222, such as restricted routes, may only be accessible by users (e.g., police, firefighters, or venue staff) with specific administrative privileges, in some embodiments.

The places database 232 stores information regarding various destinations or places of interest within one or more venues. The destinations or places of interest may be associated with a respective proximity beacon 102, GPS location 104, or geofence 106. Alternatively, the destinations or places of interest may have their geographic position stored relative to the proximity beacons 102, the GPS locations 104, or the geofences 106. Metadata regarding each destination or place of interest, in addition to its geographic position, may be stored within the places database 232. This metadata can be utilized by mobile client devices 108 or by the managing server 208 to highlight on a map where points of interest exist or to issue an alert when one of the mobile client devices 108 is near one of the points of interest.

The information stored in the places database 232 may be altered, deleted, added, or retrieved by the places server 230, in various embodiments. An example embodiment of the places database 232 is shown and defined further with respect to FIG. 5.

The traffic and capacity server 240 serves to retrieve information included in the traffic database 242. The traffic and capacity server 240 and the traffic database 242 may comprise a single computing device or may be spread across multiple computing devices, connected by a communication medium. The traffic and capacity server 240 may respond to queries received from other devices in the system 200. In some embodiments, the traffic and capacity server 240 may be a cloud server. The cloud server may require additional login credentials above those required for using the mobile client device(s) 108, the managing server 208, or any other device(s) in the system 200.

The traffic database 242 stores information regarding the traffic flow and capacity of current routes/attractions within one or more venues. The current traffic and prediction of future traffic may be based on current information that is retrieved from the mobile client devices 108 or from the population monitoring devices 110. Additionally, the current traffic and prediction of traffic may be based on historical data. The information stored within the traffic database 242 may be used by the mobile client devices 108 or the managing server 208 to identify the areas that are of interest to the greatest number of users, the peak and off times for certain routes/attractions within a venue, or, in conjunction with information from the routes between places database 222, what the most efficient route from one geographic position to another is at a given point in time.

The information stored in the traffic database 242 may be altered, deleted, added, or retrieved by the traffic and capacity server 240, in various embodiments. An example embodiment of the traffic and capacity database 242 is shown and defined further with respect to FIG. 10.

The geographic location server 250 serves to retrieve information included in the geographic location database 252. The geographic location server 250 and the geographic location database 252 may comprise a single computing device or may be spread across multiple computing devices, connected by a communication medium. The geographic location server 250 may respond to queries received from other devices in the system 200. In some embodiments, the geographic location server 250 may be a cloud server. The cloud server may require additional login credentials above those required for using the mobile client device(s) 108, the managing server 208, or any other device(s) in the system 200.

The geographic location database 252 stores information that relates to the proximity beacons 102 and the GPS locations 104 within one or more venues. This information may further include, or be linked to information stored within the places database 232 to include, metadata regarding what is physically happening within the venue at that specific location at various times. Additionally, the information stored within the geographic location database 252 may be used by the mobile client devices 108 or the managing server 208 to identify which proximity beacon 102 or which GPS location 104 is linked with which attraction within a venue, for instance.

The information stored in the geographic location database 252 may be altered, deleted, added, or retrieved by the geographic location server 250, in various embodiments. An example embodiment of the geographic location database 252 is shown and defined further with respect to FIG. 8.

The user profile server 260 serves to retrieve information included in the user profile database 262. The user profile server 260 and the user profile database 262 may comprise a single computing device or may be spread across multiple computing devices, connected by a communication medium. The user profile server 260 may respond to queries received from other devices in the system 200. In some embodiments, the user profile server 260 may be a cloud server. The cloud server may require additional login credentials above those required for using the mobile client device(s) 108, the managing server 208, or any other device(s) in the system 200.

The user profile database 262 stores information about users and their associated mobile client devices 108 within one or more venues. Such information as user preferences, user settings, and user demographics may be stored within the user profile database 262. This information may be used by the mobile client devices 108 and the managing server 208 to personalize content presented to a user on the mobile client devices 108, for example.

The information stored in the user profile database 262 may be altered, deleted, added, or retrieved by the user profile server 260, in various embodiments. An example embodiment of the user profile database 262 is shown and defined further with respect to FIG. 9.

FIG. 3 is an illustration of an image forming apparatus, such as the scanner 204 or the printer 206, according to example embodiments. The image forming apparatus 204/206 may alternatively be a multifunctional product (MFP) that serves both as the scanner 204 and as the printer 206. The image forming apparatus 204/206 may be configured to print partially-stored and/or fully-stored electronic documents on various types of physical output media (i.e., the image forming apparatus 204/206 may be configured to print documents incrementally, as they are received by the image forming apparatus 204/206, or documents that have been fully received by the image forming apparatus 204/206). These output media include, but are not limited to, various sizes and types of paper, overhead transparencies, three-dimensional (3D) plastics, and so on.

The image forming apparatus 204/206 may serve as a local peripheral to a computing device such as a desktop computing device, laptop computing device, server computing device, or a print server. In these cases, the image forming apparatus 204/206 may be attached to the computing device by cable, such as a serial port cable, parallel port cable, USB cable, FireWire® (IEEE 1394) cable, or High-Definition Multimedia Interface (HDMI) cable. Thus, the computing device may serve as a source of electronic documents for the image forming apparatus 204/206. For example, the computing device may communicate over the network 202 with other components of the system 202 to receive print data for the printer 206 or transmit scanned data from the scanner 204.

On the other hand, the image forming apparatus 204/206 may include a wireline or wireless network interface, such as an Ethernet or Wi-Fi® interface. So arranged, the image forming apparatus 204/206 may serve as a printing device for any number of computing devices that can communicate with the image forming apparatus 204/206 over a network. In some embodiments, the image forming apparatus 204/206 may serve as both a local peripheral and a networked printer at the same time. For example, the image forming apparatus 204/206 may serve as the printer 206 for both the mobile client devices 108 that are nearby, as well as the printer 206 for a desktop computing device that is utilized by employees of a given venue.

In order to use the image forming apparatus 204/206, computing devices may install one or more drivers. These drivers may include software components that convert the electronic documents to be printed from various local representations stored on the computing devices to one or more representations supported by the printer 206. Or, in the case of the scanner 204, allow the computing device to convert image data received from the scanner 204 into an electronic document.

In order to support its various capabilities, the image forming apparatus 204/206 may include a document feeder/output tray 302, paper storage 304, a user interface 306, a scanning element 308, and a chassis 310. It should be understood that image forming apparatuses may take on a wide variety of forms. Therefore, the scanner 204 or printer 206 may include more or fewer components than depicted in FIG. 3, and/or components arranged in a different fashion than depicted in FIG. 3.

The document feeder/output tray 302 may hold physical documents (e.g., a stack of one or more sheets of paper) that are to be scanned, copied, or faxed. Advantageously, the document feeder/output tray 302 may allow the image forming apparatus 204/206 to automatically feed multiple physical documents for processing by the image forming apparatus 204/206 without requiring manual intervention. The document feeder/output tray 204/206 may also include one or more separate output trays for holding physical documents that have been processed by the image forming apparatus 204/206. These may include physical documents that have been scanned, copied, or faxed by the image forming apparatus 204/206, as well as physical documents that have been produced by, e.g., the fax and/or copying functions of the image forming apparatus 204/206.

Paper storage 304 may include trays and/or feeding elements for various types of physical media. For instance, paper storage 304 may include separate trays for 8.5×11 inch paper, A4 paper, letterhead paper, envelopes, and so on. For any operation of the image forming apparatus 204/206 that involves outputting physical media (e.g., printing, copying, and/or receiving a fax), paper storage 304 may supply the physical media. In embodiments where the printer 206 is capable of 3D printing, the paper storage 304 may supply the physical media in the form of acrylic (polymethyl methacrylate—PMMA), acrylonitrile butadiene styrene (ABS), or polylactic acid (PLA), for example.

The user interface 306 may facilitate the interaction of the image forming apparatus 204/206 with a human or non-human user, such as to receive input from a user and to provide output to the user. The user interface 306 may allow, for example, a patron of a venue that does not have a mobile client device 108 to nonetheless track a route that they are traversing by inputting user identification information into scanner(s) 204 associated with various geographic locations, scanning waypoint images of information gathered at the respective geographic locations, and uploading them to the user profile database 262. Thus, the user interface 306 may include input components such as a keypad, keyboard, touch-sensitive or presence-sensitive panel, joystick, microphone, still camera, and/or video camera. The user interface 306 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. The user interface 306 may also be configured to be able to generate audible output(s), via a speaker, speaker jack, audio output port, audio output device, earphones, and/or other similar devices, now known or later developed in the future.

The scanning element 308 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with the scanner 204.

The chassis 310 may include a physical housing that contains and/or interconnects various components of the image forming apparatus 204/206, such as the document feeder/output tray 302, paper storage 304, the user interface 306, and the scanning element 308. Additionally, the chassis 310 may house other components not shown in FIG. 3. For example, the chassis 310 may contain one or more toner cartridges, liquid ink jets, belts, rollers, and/or power supplies. Further, the chassis 310 may include communication interfaces, such as wireline and/or wireless network interfaces, a telephony interface (e.g., an RJ45 jack), a USB interface, a Bluetooth® interface, a card reader port, etc.

Moreover, as the image forming apparatus 204/206 may be based on general-purpose and/or specially-designed computing device components, the chassis 310 may also house some or all of these components. To that point, FIG. 4 depicts an example embodiment 400 of computing device components (e.g., functional elements of a computing device) that may be included in the scanner 204, the printer 206.

FIG. 4 is a schematic block diagram illustrating computing device components of an image forming apparatus, such as the scanner 204 or the printer 206, the mobile client devices 108, or the servers 208, 210, 220, 230, 240, 250, 260, according to example embodiments.

Computing device components 400 may include a processor 402, memory 404, and an input/output unit 406, all of which may be coupled by a system bus 408 or a similar mechanism. The processor 402 may include one or more central processing units (CPUs), such as one or more general purpose processors and/or one or more dedicated processors (e.g., application specific integrated circuits, ASICs, or digital signal processors, DSPs, etc.).

Memory 404, in turn, may comprise volatile and/or non-volatile data storage and can be integrated in whole or in part with the processor 402. Memory 404 may store program instructions, executable by the processor 402, and data that are manipulated by these instructions to carry out the various methods, processes, or functions described herein. Alternatively, these methods, processes, or operations can be defined by hardware, firmware, and/or any combination of hardware, firmware, and software. Therefore, memory 404 may include a tangible, non-transitory, computer-readable medium, having stored thereon program instructions that, upon execution by one or more processors 402, cause the respective devices to carry out any of the methods, processes, or functions disclosed in this specification or the accompanying drawings.

In addition, memory 404 may store the information contained within the mobile client device 108 or the databases 212, 222, 232, 242, 252, 262 regarding the state of the system 200. For example, the memory 404 of the user profile database 262 may store the current location of the mobile client device 108 associated with one of the users.

The input/output unit 406 may include any of the operations and/or elements described in reference to the user interface 406. Thus, the input/output unit 406 may serve to configure and/or control the operation of the processor 402. The input/output unit 406 may also provide output based on the operations performed by the processor 402.

These examples are provided for illustrative purposes. In addition to and/or alternatively to the examples above, other combinations and/or sub-combinations of printer, scanner, and computer technologies may also exist, among other possibilities, without departing from the scope of the embodiments herein.

FIG. 5 is an illustration of the places database 232, or a subset of the places database 232, according to example embodiments. The illustration of FIG. 5 may represent data stored within the memory 404 of the places database 232 or associated with the places database 232. The places database 232 may include a places listing 502 associated with each place that is in the places database 232. Within each places listing 502, there may be a identifier (ID) (places) 512, a location in GPS coordinates (places) 514, a location description (places) 516, a listing of viewing duration times (places) 518, a capacity description (places) 520, a popularity ranking (places) 522, message pointers (places) 524, content pointers (places) 526, peak calendar times (places) 528, scheduled demos (places) 530, a listing of special staffing or guest speakers (places) 532, a featured ranking (places) 534, a special peak message (places) 536, a priority (places) 538, and a list of constraints (places) 540.

The places listing 502 associated with each place represents an entry within the places database 232 for each place within the system 200 that is being monitored by devices within the system 200. The places within a respective venue that are being monitored may be points of interest or importance, such as exhibits, gift shops, food vendors, restrooms, meeting places, first aid locations, venue offices, police stations, lost and found, etc. The places database 232 may contain places listings 502 associated within more than one venue.

The ID (places) 512 may be an identifier assigned to each places listing 502. The ID (places) 512 may be assigned by the mobile client devices 108, the managing server 208, or the places server 230, in various embodiments. The ID (places) 512 may be used by the devices of the system 200 to retrieve information regarding a particular places listing 502. For example, a request to retrieve data regarding a particular places listing 502 may be issued from one of the mobile client devices 108 to the places server 230 that uses the ID (places) 512 as header information in the request.

The location in GPS coordinates (places) 514 may indicate the GPS position of the respective places listing 502. In some embodiments, the GPS coordinates (places) 514 may be given to 4 decimal places, as in the example embodiment of FIG. 5.

The location description (places) 516 may be a description of the places listing 502 that indicates what is happening within the system 200 at the geographic location. The location description (places) 516 may be a searchable field by the mobile client devices 108 and/or the managing server 208, in certain embodiments. This may aid in the identification of potential places of interest to a user of one of the mobile devices 108. For example, one of the mobile devices 108 could perform a search of the places database 232 for the string "restroom" within the location description (places) 516 field, and have the places listings 502 for all bathrooms within a venue returned.

The listing of viewing duration times (places) 518 may indicate the average duration patrons or mobile client devices 108 spend at the respective places listing 502. This information may be an amalgamation of information retrieved from mobile client devices 108 and/or population monitoring devices 110, for example. In the example embodiment of FIG. 5, there is a high amount of time (indicated by an 'H'), a medium amount of time (indicated by an 'M'), and a low amount of time (indicated by an 'L') for each listing of viewing duration times (places) 518. These varied times (high/medium/low), for example, may represent the $75^{th}$, $50^{th}$, and $25^{th}$ percentiles of the amount of time spend at the respective places listing 502.

The capacity description (places) 520 may indicate how many patrons may occupy the respective places listing 502. In the example embodiment of FIG. 5, the number of seats, standing spaces, and aisle spaces available at the respective places listing 502 is indicated. The capacity description (places) 520 may be used by the managing server 208, in conjunction with information from the traffic database 242 and/or the user profile database 262, to determine how much seating remains at the respective places listing 502 at a given time.

The popularity ranking (places) 522 may be an indication of the popularity of the respective places listing 502. The popularity ranking (places) 522 may be stored within the places database 232 as an integer, for example. In some embodiments, the popularity ranking (places) 522 may be an actual ranking (i.e., all of the places within a given venue are ranked from most popular to least popular and then assigned integers indicating that popularity ranking). In other embodiments, the popularity ranking (places) 522 may be a number that indicates popularity, but is less precise (i.e. two different places listings 502 may have identical popularity rankings (places) 522), such as an integer from one to ten. The popularity ranking (places) 522 may be derived from user preferences listed in the user profile database 262 or based on past populations recorded by the managing server 208, the mobile client devices 108, or the population monitoring devices 110, for example.

Additionally or alternatively, the popularity ranking (places) 522 may be broken down by certain demographics within the venue. For example, there may be a ranking of the respective places listing 502 that corresponds to those patrons over the age of 50 or that corresponds to those patrons who are females. Therefore, the popularity ranking (places) 522 may include multiple rankings for multiple demographics, in some embodiments.

The message pointers (places) 524 may point to messages in the memory 404 of the places database 232 that is to be transmitted by the managing server 208 or the places server 230 to mobile client devices 108 upon the mobile client devices 108 entering a threshold geographic distance of the respective places listing 502. In some embodiments, more than one pointer may be included in the message pointers (places) 524. For example, one pointer may indicate the message that is to be transmitted to the mobile client devices 108 when they are 15 meters away from the respective places listing 502 and another pointer may indicate the message that is to be transmitted to the mobile client devices 108 when they are 5 meters away from the respective places listing 502.

The content pointers (places) 526 may point to content in the memory 404 of the places database 232 that is associated with the respective places listing 502. Such content may include images, advertisements, web-addresses, etc. This information may be retrieved by the mobile client devices 108 when the mobile client devices 108 are geographically near the respective places listing 502, for example.

The peak calendar times (places) 528 may indicate what time the respective places listing 502 is the busiest (populated by patrons). This population comparison may be relative (i.e., compared with the other places listings 502 in a given venue at a given time) or absolute (i.e., compared with other populations at the respective places listing 502 at other times within the calendar). The peak calendar times (places) 528 may indicate one or more times a day, a month, or, as in the embodiment of FIG. 5, a year when the respective places listing 502 is the most busy. This information may be used by the mobile client device 108 or the managing server 208 to aid in planning a route that traverses a venue, for example.

The schedule demos (places) 530 may indicate if, and when, any demonstrations may be occurring at the respective places listing 502. In some embodiments, the schedule demos (places) 530 may additionally indicate if the demonstrations are recurring, and if so, how often they will occur (e.g. daily, monthly, yearly). Again, this information may be used by the mobile client device 108 or the managing server 208 to aid in planning a route that traverses a venue.

The listing of special staffing or guest speakers (places) 532 may indicate if any special individuals and/or patrons are at the respective places listing 502. The listing of special staffing or guest speakers (places) 532 may additionally include future times when special individuals and/or patrons will be at the respective places listing 502. Again, this information may be used by the mobile client device 108 or the managing server 208 to aid in planning a route that traverses a venue.

The featured ranking (places) 534 may indicate a temporary ranking established that highlights certain respective places listings 502 within a venue. For example, if the relevant venue is a zoo, and it is currently "panda week", the places listing 502 that is associated with the panda exhibit may have a higher featured ranking (places) 534 than it would at other times throughout the year. The featured ranking (places) 534 may be set by the managing server 208, one or more of the mobile client devices 108, or the places server 230, in various embodiments.

The special peak message (places) 536 may indicate a message that is to be transmitted by the managing server 208 or the places server 230 to mobile client devices 108 upon the mobile client devices 108 entering a threshold geographic distance of the respective places listing 502 during a peak time (e.g., the time indicated by the peak calendar times (places) 528). This special peak message (places) 536 may be an advertisement, an alert, or an image, for example. In addition, the special peak message (places) 536 may indicate a message that is to be transmitted by the managing server 208 or the places server 230 to mobile client devices 108 of venue staff to indicate that hours should be extended for certain exhibits or more staff should go to a certain geographic location to answer questions. The special peak message (places) 536 may therefore aid venue staff in managing traffic within the venue.

The priority listing (places) 538 may indicate the priority of the respective places listing 502. This information may indicate how frequently the respective places listing 502 is updated, for example, or how well the respective geographic location is maintained. In some examples, such as the embodiment shown in FIG. 5, the priority listing (places) 538 may be a string that indicates the priority of the respective places listing 502. In alternate embodiments, the priority listing (places) 538 may be an integer, for example.

The list of constraints (places) 540 may indicate any constraints that are present at the respective places listing 502. Some example constraints may be closing times, as illustrated in FIG. 5, non-handicap accessibility, only accepting cash for sales, etc. This information may be used by the mobile client device 108 or the managing server 208 to aid in planning a route that traverses a venue.

FIG. 6 is an illustration of the venue maps database 212, or a subset of the venue maps database 212, according to example embodiments. The illustration of FIG. 6 may represent data stored within the memory 404 of the venue maps database 212 or associated with the venue maps database 212. The venue maps database 212 may include a map listing 602 associated with each map that is in the venue maps database 212. Within each venue maps listing 602, there may be a location (venue maps) 612, a building (venue maps) 614, a floor (venue maps) 616, a section (venue maps) 618, a list of walkways (venue maps) 620, a grid description (venue maps) 622, message pointers (venue maps) 624, content pointers (venue maps) 626, walkway capacity (venue maps) 628, a list of demos blocking aisles (venue maps) 630, a list of special delays (venue maps) 632, peak calendar times (venue maps) 634, a seasonal display listing (venue maps) 636, a priority listing (venue maps) 638, and a listing of constraints (venue maps) 640.

The map listing 602 associated with each map represents an entry within the venue maps database 212 for each map that describes a venue or a subsection of a venue. The venue maps database 212 may contain map listings 602 associated with more than one venue. Example venues include sports stadiums, public parks, shopping malls, and, in the case of the example embodiment of FIG. 6, zoos and hospitals.

The location (venue maps) 612 may indicate the location of the respective map listing 602. The location (venue maps) 612 may be a venue, for example. In some embodiments, the location may be an identifiable geographic location, such as a city, county, state, or country, for example. The location (venue maps) 612 may be a field searchable by the mobile client devices 108 and/or the managing server 208, in certain embodiments. This may be used by one of the mobile client devices 108, for example, upon entering a new venue or subsection of a venue, to find the relevant map. The mobile client device 108 may then print the relevant map using one of the printers 206 or display the relevant map on a user interface.

The building (venue maps) 614 may indicate which subsection of a venue the respective map listing 602 relates to. In particular, the building (venue maps) 614 may indicate which building within a venue the respective map listing 602 relates to. The building (venue maps) 614 may be a field searchable by the mobile client devices 108 and/or the managing server 208, in certain embodiments.

The floor (venue maps) 616 may indicate which subsection of a venue the respective map listing 602 relates to. In particular, the floor (venue maps) 616 may indicate which floor, within a building, within a venue the respective map listing 602 relates to. The floor (venue maps) 616 may be a field searchable by the mobile client devices 108 and/or the managing server 208, in certain embodiments.

The section (venue maps) 618 may indicate which subsection of a venue the respective map listing 602 relates to. In particular, the section (venue maps) 614 may indicate which section, within a building within a floor, within a venue the respective map listing 602 relates to. The section (venue maps) 618 may be a field searchable by the mobile client devices 108 and/or the managing server 208, in certain embodiments.

The list of walkways (venue maps) 620 may indicate walkways which are present within the respective map listing 602. These walkways may, as in the example embodiment of FIG. 6, be broken down into which walkways run North/South, which run East/West, and which run in none of the cardinal directions and/or meander in multiple directions. The list of walkways (venue maps) 620 may also include metadata about the walkways besides direction, such as walkway size, walkway length, and walkway starting point and ending point in terms of geographic position or location within a venue. The list of walkways (venue maps) 620 may be used by the mobile client device 108 or the managing server 208 to aid in planning a route that traverses a venue, for example.

The grid description (venue maps) 622 may indicate where the respective map listing 602 lies within a venue relative to the remainder of the venue. The grid description (venue maps) 622 may use venue coordinates to describe the location. The venue coordinates may be established by the mobile client device 108, the managing server 208, or the venue maps server 210 to identify different regions within a venue. The venue coordinates, in some embodiments, may reflect physical distances, such as feet, meters, or miles. In the example of FIG. 6, for instance, the starting point of the grid description (venue maps) 622 represents the x-coordinate and y-coordinate of the bottom left hand corner of the map in relation to an entire venue and the ending point of the grid description (venue maps) 622 represents the x-coordinate and y-coordinate of the top right hand corner of the map in relation to the entire venue.

The message pointers (venue maps) 624 may indicate the locations of messages within the memory 404 of the venue maps database 212 that may be transmitted to the mobile client devices 108 along with the respective map listing 602 when the respective map listing 602 is requested by the mobile client devices 108. Such messages may include information about the respective map listing 602, such as when the map listing 602 was last updated.

The content pointers (venue maps) 626 may indicate the location of the respective map listing 602 within the memory 404 of the venue maps database 212 that may be transmitted to the mobile client devices 108 or the managing server 208 when requested. The respective map listing 602 may be saved within the venue maps database 212 in a variety of formats in various embodiments, such as a portable document format (PDF) file, a joint photographic experts group (JPEG) file, or a portable network graphics (PNG) file, for example.

The walkway capacity (venue maps) 628 is an additional piece of walkway metadata that may be included in the respective map listing 602. The walkway capacity (venue maps) 628 may describe some or all of the walkways included in the list of walkways (venue maps) 620. The walkway capacity (venue maps) 628 may be a string indicating the capacity, as in the example embodiment of FIG. 6. Alternatively, the walkway capacity (venue maps) 628 may be a number that indicates how many patrons can be within a given walkways at one time.

The list of demos blocking aisles (venue maps) 630 may list demonstrations, who location is included on the respective map listing 602, that block walkways or other transit ways within the map from being traversed. The list of demos blocking aisles (venue maps) 630 may include demonstrations that are indicated on the respective map listing 602, already, or temporary demonstrations that are not up-to-date on the current version of the respective map listing 602.

The list of special delays (venue maps) 632 may indicate regions of the respective map listing 602 that will be altered or slowed due to temporary activities occurring within a given time period. For example, in the embodiment of FIG. 6, the lion exhibit within the zoo may be particularly populated by patrons because lion cubs were born today. As another example, also shown in FIG. 6, the east wing of the $5^{th}$ floor of the oncology building at the hospital may be busy at 7:00 PM because that is the time scheduled for patient visitation.

The list of peak calendar times (venue maps) 634 may include a list of the most populated times for the respective map listing 602. This list of peak calendar times (venue maps) 634 may indicate specific peak calendar times within a day, within a month, or, as in the example embodiment of FIG. 6, within a year.

The seasonal display listing (venue maps) 636 may indicate any special displays present within the region of the venue included in the respective map listing 602. This information may be used by the mobile client devices 108 or the managing server 208 to determine a customized route for one of the mobile client devices 108 or as further information that indicates predicted populated areas within the section of the venue included in the respective map listing 602.

The priority listing (venue maps) 638 may indicate the priority of the region of the venue included in the respective map listing 602. This information may indicate how frequently the map is updated, for example, or how well the region is maintained. In some examples, such as the embodiment shown in FIG. 6, the priority listing (venue maps) 638 may be a string that indicates the priority of the region. In alternate embodiments, the priority listing (venue maps) 638 may be an integer, for example.

The listing of constraints (venue maps) 640 may indicate additional information about the region of the venue included in the respective map listing 602, such as when the map is valid (i.e., when the items depicted on the map are in their depicted locations) or if updates or renovations have been added the region of the venue that are not depicted on the respective map.

Figure 7:
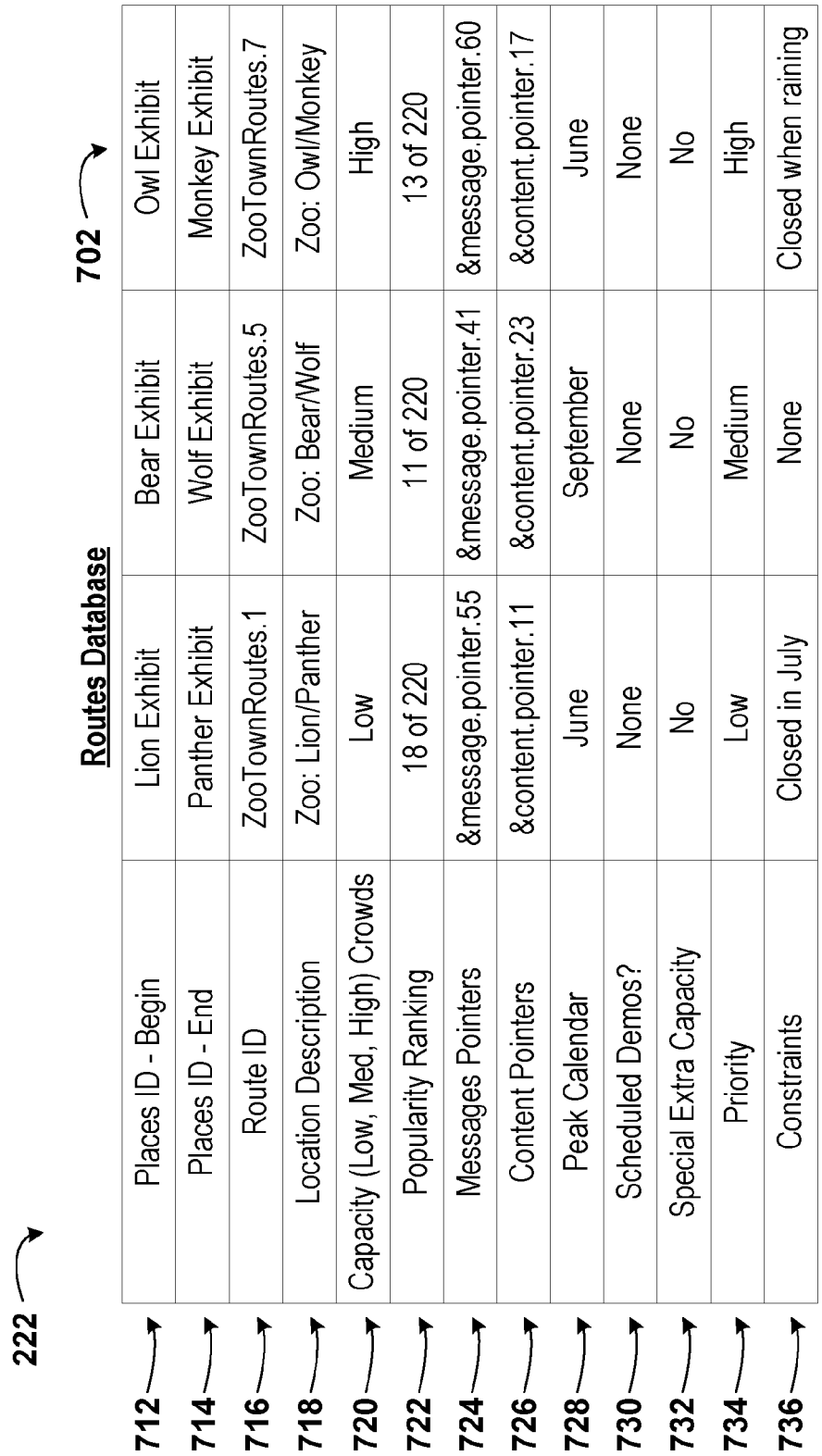
FIG. 7 is an illustration of another database, according to example embodiments.

FIG. 7 is an illustration of the routes between places database 222, or a subset of the routes between places database 222, according to example embodiments. The illustration of FIG. 7 may represent data stored within the memory 404 of the routes between places database 222 or associated with the routes between places database 222. The routes between places database 222 may include a route listing 702 associated with each route that is in the routes between places database 222. Within each route listing 702, there may be a beginning places ID (routes) 712, an ending places ID (routes) 714, a route ID (routes) 716, a location description (routes) 718, a crowd capacity description (routes) 720, a popularity ranking (routes) 722, message pointers (routes) 724, content pointers (routes) 726, a list of peak calendar times (routes) 728, a list of scheduled demonstrations (routes) 730, a special extra capacity listing (routes) 732, a priority description (routes) 734, and a constraints description (routes) 736.

The route listing 702 associated with each route may represent an entry within the routes between places database 222 that represents a route within a venue. The routes between places database 222 may contain routes associated with more than one venue.

There beginning places ID (routes) 712 may indicate the title of a geographic location where the respective route listing 702 begins. This title may be as the geographic location is listed in the geographic location database 252, the places database 232, one or more of the mobile client devices 108, or the managing server 208, for example. The beginning places ID (routes) 712 may be a field searchable by the mobile client devices 108 and/or the managing server 208, in certain embodiments. This may be used by one of the mobile client devices 108, for example, to find a route that starts form the current location of the mobile client device 108 and goes to another location within the venue.

The ending places ID (routes) 714 may indicate the title of a geographic location where the respective route listing 702 ends. This title may be as the geographic location is listed in the geographic location database 252, the places database 232, one or more of the mobile client devices 108, or the managing server 208, for example. The ending places ID (routes) 714 may be a field searchable by the mobile client devices 108 and/or the managing server 208, in certain embodiments. This may be used by one of the mobile client devices 108, for example, to find a route that ends at a specific location within the venue.

The route ID (routes) 716 may indicate the title the respective route listing 702 begins. The route ID (routes) 716 may be a field searchable by the mobile client devices 108 and/or the managing server 208, in certain embodiments. The route ID (routes) 716 may be a string or a numeral assigned to the respective route listing 702 within the routes between places 222 database, for example. The route ID (routes) 716 may be assigned by one of the mobile client devices 108, the managing server 208, or the routes between places server 220, in various embodiments.

The location description (routes) 718 may describe the location of the respective route listing 702. The location description (routes) 718 may be the region or sub-region of a venue in which the respective route listing 702 is located. Alternatively, as illustrated in FIG. 7, the location description (routes) 718 may indicate the venue as well as the geographic locations within the venue that are the starting and ending points of the respective route listing 702. The location description (routes) 718 may be a field searchable by the mobile client devices 108 and/or the managing server 208, in certain embodiments.

The crowd capacity description (routes) 720 may indicate the population of patrons which can occupy the respective route listing 702. As illustrated in FIG. 7, the crowd capacity description (routes) 720 may be a string that represents how many patrons can utilize the respective route listing 702 at the same time (e.g., "low", "medium", "high"), for example. In alternate embodiments, the crowd capacity description (routes) 720 may be a number that represents how many patrons can utilize the respective route listing 702 (e.g., 50, 100, 500). The crowd capacity description (routes) 720 may be a field searchable by the mobile client devices 108 and/or the managing server 208, in certain embodiments.

The popularity ranking (routes) 722 may indicate the popularity of the respective route listing 702. As illustrated in FIG. 7, the popularity ranking (routes) 722 may be a number that represents the ranking of the respective route listing 702 when compared to other routes within the venue. For example, the bear exhibit to wolf exhibit route in FIG. 7 may be the 11$^{th}$ most popular route within the venue. Alternatively, the popularity ranking (routes) 722 may compare the respective route listing 702 to all route listings within the routes between places database 222, even those routes from other venues. In other embodiments, the popularity ranking (routes) 722 may be a string that represents the popularity of the respective route listing 702 (e.g., "low", "medium", "high").

The message pointers (routes) 724 may indicate the locations of messages within the memory 404 of the routes between places database 222 that may be transmitted to the mobile client devices 108 along with the respective route listing 702 when the respective route listing 702 is requested by the mobile client devices 108. Such messages may include information about the respective route listing 702, such as when the respective route listing 702 was last updated.

The content pointers (routes) 726 may indicate the location of the respective route listing 702 within the memory 404 of the routes between places database 222 that may be transmitted to the mobile client devices 108 or the managing server 208 when requested. The respective route listing 702 may be saved within the routes between places database 222 in a variety of formats in various embodiments, such as a text file that contains GPS positions that are to be following by the mobile client device 108 when traversing the respective route listing 702.

The list of peak calendar times (routes) 728 may include a list of the most populated times for the respective route listing 702. This list of peak calendar times (routes) 728 may indicate specific peak calendar times within a day, within a month, or, as in the example embodiment of FIG. 7, within a year.

The list of scheduled demonstrations (routes) 730 may indicate if, and when, any demonstrations may be occurring along the respective routes listing 702. In some embodiments, the list of scheduled demonstrations (routes) 730 may additionally indicate if the demonstrations are recurring, and if so, how often they will occur (e.g. daily, monthly, yearly). Again, this information may be used by the mobile client device 108 or the managing server 208 to aid in planning a route that traverses a venue.

The special extra capacity listing (routes) 732 may indicate if the respective route listing 702 has additional capacity compared to other routes within the respective venue. Alternatively, the special extra capacity listing (routes) 732 may indicate if the respective route listing 702 has additional capacity during a particular time period (e.g., the peak calendar times or when construction is occurring on other routes within the respective venue).

The priority description (routes) 734 may indicate the priority of the respective route listing 702. This information may indicate how frequently the respective route listing 702 is updated, for example, or how well the respective route is maintained. In some examples, such as the embodiment shown in FIG. 7, the priority description (routes) 734 may be a string that indicates the priority of the region. In alternate embodiments, the priority description (routes) 734 may be an integer, for example.

The constraints description (routes) 736 may indicate additional information about the respective route listing 702, such as if there is a certain time period when the respective route is closed.

FIG. 8 is an illustration of the geographic location database 252, or a subset of the geographic location database 252, according to example embodiments. The illustration of FIG. 8 may represent data stored within the memory 404 of the geographic location database 252 or associated with the geographic location database 252. The geographic location database 252 may include a geographic location listing 802 associated with each geographic location that is in the geographic location database 252. Within geographic location listing 802, there may be a beacon/geofence ID (geographic location) 812, a location in GPS coordinates (geographic location) 814, a location description (geographic location) 816, a range setting (geographic location) 818, a listing of viewing duration times (geographic location) 820, a listing of capacities (geographic location) 822, a popularity ranking (geographic location) 824, message pointers (geographic location) 826, content pointers (geographic location) 828, peak calendar times (geographic location) 830, scheduled demonstrations (geographic location) 832, a list of special staffing or guest speakers (geographic location) 834, a featured ranking (geographic location) 836, a seasonal display listing (geographic location) 838, a priority listing (geographic location) 840, and a constraints listing (geographic location) 842.

The geographic location listing 802 associated with each geographic location may represent an entry within the geographic location database 252 that represents a geographic location within a venue. The geographic location database 252 may contain routes associated with more than one venue. Furthermore, each geographic location listing 802 may represent a proximity beacon 102, a set of GPS coordinates 104, or a geofence 106 within the system 100.

The beacon/geofence ID (geographic location) 812 may indicate the ID that was assigned to the respective geographic location listing 802. This ID may be assigned by the mobile client device 108, managing server 208, or the geographic location server 250, in various embodiments. The beacon/geofence ID (geographic location) 812 may be a field searchable by the mobile client devices 108 and/or the managing server 208, in certain embodiments.

The location in GPS coordinates (geographic location) 814 may represent the GPS position of the respective geographic location listing 802. This may be the geographic position of the respective proximity beacon 102, for example. In some embodiments, the GPS coordinates (geographic location) 814 may be given to 4 decimal places, as in the example embodiment of FIG. 8.

The location description (geographic location) 816 may be a description of the respective geographic location listing 802 that indicates what is happening within the system 200 at the geographic location. The location description (geographic description) 516 may be a searchable field by the mobile client devices 108 and/or the managing server 208, in certain embodiments. This may aid in the identification of potential places of interest to a user of one of the mobile devices 108. For example, one of the mobile devices 108 could perform a search of the geographic location database 252 for the string "bathroom" within the location description (geographic location) 516 field, and have the geographic location listings 802 for all bathrooms within a venue returned.

The range setting (geographic location) 818 may indicate threshold distances from the respective geographic location listing 802 that should be monitored by the mobile client device 108. The range setting (geographic location) 818 may define one or more geofences 106 based on the geographic position of the respective proximity beacons 102 or GPS locations 104, for example.

The listing of viewing duration times (geographic location) 820 may indicate the average duration patrons or mobile client devices 108 spend at the respective geographic location listing 802. This information may be an amalgamation of information retrieved from mobile client devices 108 and/or population monitoring devices 110, for example. In the example embodiment of FIG. 8, there is a high amount of time (indicated by an 'H'), a medium amount of time (indicated by an 'M'), and a low amount of time (indicated by an 'L') for each listing of viewing duration times (geographic location) 820. These varied times (high/medium/low), for example, may represent the $75^{th}$, $50^{th}$, and $25^{th}$ percentiles of the amount of time spend at the respective geographic location listing 802.

The listing of capacities (geographic location) 822 may indicate how many patrons may occupy the respective geographic location listing 802. In the example embodiment of FIG. 8, the number of spaces available at the respective geographic location listing 802 is indicated by distance (far, mid-range, and near) from the respective geographic location listing 802. The listing of capacities (geographic location) 822 may be used by the managing server 208, in conjunction with information from the traffic database 242 and/or the user profile database 262, to determine how much space remains at the respective geographic location listing 802 at a given time.

The popularity ranking (geographic location) 824 may indicate the popularity of the respective geographic location listing 802. As illustrated in FIG. 8, the popularity ranking (geographic location) 824 may be a number that represents the ranking of the respective geographic location listing 802 when compared to other geographic locations within the venue. For example, the panda exhibit in FIG. 8 may be the $5^{th}$ most popular route within the venue. Alternatively, the popularity ranking (geographic location) 824 may compare the respective geographic location listing 802 to all geographic location listings within the geographic location database 252, even those geographic locations from other venues. In other embodiments, the popularity ranking (geographic location) 824 may be a string that represents the popularity of the respective geographic location listing 802 (e.g., "low", "medium", "high").

The message pointers (geographic location) 826 may indicate the locations of messages within the memory 404 of the geographic location database 252 that may be transmitted to the mobile client devices 108 along with the respective geographic location listing 802 when the respective geographic location listing 802 is requested by the mobile client devices 108. Such messages may include information about the respective geographic location listing 802, such as when the respective geographic location listing 802 was last updated.

The content pointers (geographic location) 828 may indicate the location of the respective geographic location listing 802 within the memory 404 of the geographic location database 252 that may be transmitted to the mobile client devices 108 or the managing server 208 when requested. The respective geographic location listing 802 may be saved within the geographic location database 252 in a variety of formats in various embodiments, such as a string that contains the beacon/geofence ID (geographic location) 812 or the location in GPS coordinates (geographic location) 814.

The peak calendar times (geographic location) 830 may include a list of the most populated times for the respective geographic location listing 802. This list of peak calendar times (geographic location) 830 may indicate specific peak calendar times within a day, within a month, or, as in the example embodiment of FIG. 8, within a year.

The scheduled demonstrations (geographic location) 832 may indicate if, and when, any demonstrations may be occurring at the respective geographic location listing 802. In some embodiments, the scheduled demonstrations (geographic location) 832 may additionally indicate if the demonstrations are recurring, and if so, how often they will occur (e.g. daily, monthly, yearly). Again, this information may be used by the mobile client device 108 or the managing server 208 to aid in planning a route that traverses a venue.

The list of special staffing or guest speakers (geographic location) 834 may indicate if any special individuals and/or patrons are at the respective geographic places listing 802. The list of special staffing or guest speakers (geographic location) 834 may additionally include future times when special individuals and/or patrons will be at the respective geographic location listing /02. Again, this information may be used by the mobile client device 108 or the managing server 208 to aid in planning a route that traverses a venue.

The featured ranking (geographic location) 836 may indicate a temporary ranking established that highlights certain respective geographic location listings 802 within a venue. For example, if the relevant venue is a zoo, and it is currently "panda week", the geographic location listing 802 that is associated with the panda exhibit may have a higher featured ranking (geographic location) 836 than it would at other times throughout the year. The featured ranking (geographic location) 826 may be set by the managing server 208, one or more of the mobile client devices 108, or the geographic location server 252, in various embodiments.

The seasonal display listing (geographic location) 838 may indicate a temporary display that is at the respective geographic location listing 802 for a certain time. For example, there may be a light display at one of the geographic location listings 802 during the month of December to celebrate the holidays.

The priority listing (geographic location) 840 may indicate the priority of the respective geographic location listing 802. This information may indicate how frequently the respective geographic location listing 802 is updated, for example, or how well the respective geographic location is maintained. In some examples, such as the embodiment shown in FIG. 8, the priority listing (geographic location) 840 may be a string that indicates the priority of the respective geographic location listing 802. In alternate embodiments, the priority listing (geographic location) 840 may be an integer, for example.

The constraints listing (geographic location) 842 may indicate additional information about the respective geographic location listing 802, such as if there is a certain time period when the respective geographic location is closed.

FIG. 9 is an illustration of the user profile database 262, or a subset of the user profile database 262, according to example embodiments. The illustration of FIG. 9 may represent data stored within the memory 404 of the user profile database 262 or associated with the user profile database 262. The user profile database 262 may include a user profile listing 902 associated with each user profile that is in the user profile database 262. Within each user profile listing 902, there may be a user ID (user profile) 912, a list of the GPS coordinates (user profile) 914, a mobile device ID (user profile) 916, a range setting (user profile) 918, a listing of duration times (user profile) 920, a prioritized places list (user profile) 922, a popularity ranking (user profile) 924, a busy action (user profile) 926, broadcast message(s) (user profile) 928, scheduled demonstrations (user profile) 930, special requests for speakers (user profile) 932, a priority listing (user profile) 934, a listing of constraints (user profile) 936, languages (user profile) 938, and a listing of disabilities (user profile) 940.

The user profile listing 902 associated with each user profile may represent an entry within the user profile database 262 that represents a user profile associated with one or more of the mobile client devices 108.

The user ID (user profile) 912 may indicate the user ID that was assigned to the respective user profile listing 902. The user ID (user profile) 912 may be assigned by the mobile client device 108, the managing server 208, or the user profile server 260, in various embodiments.

The list of the GPS coordinates (user profile) 914 may represent the GPS position of the mobile client device 108 corresponding to the respective user profile listing 902. This may be the geographic position. In some embodiments, the list of the GPS coordinates (user profile) 914 may be given to 4 decimal places, as in the example embodiment of FIG. 9.

The mobile device ID (user profile) 916 may indicate the mobile device ID that was assigned to the mobile client device 108 corresponding to the respective user profile listing 902. This mobile device ID (user profile) 916 may be assigned by the mobile client device 108, the managing server 208, or the user profile server 260, in various embodiments.

The range setting (user profile) 918 may indicate threshold distances from the mobile client device 108 corresponding to the respective user profile listing 902 that may be monitored by the mobile client device 108 (i.e., whenever another mobile client device 108, a proximity beacon 102, or a set of GPS coordinates 104 is within the threshold distance, the mobile client device 108 corresponding to the respective user profile listing 902 may perform some action).

The listing of duration times (user profile) 920 may indicate the average duration that the mobile client device 108 corresponding to the respective user profile listing 902 spends at geographic locations. This information may be an amalgamation of information retrieved from mobile client devices 108 and/or population monitoring devices 110, for example. In the example embodiment of FIG. 9, there is a high amount of time (indicated by an 'H'), a medium amount of time (indicated by an 'M'), and a low amount of time (indicated by an 'L') for each listing of duration times (user profile) 920. These varied times (high/medium/low), for example, may represent the $75^{th}$, $50^{th}$, and $25^{th}$ percentiles of duration times.

The prioritized places list (user profile) 922 may include a list that indicates which places within a venue or across multiple venues the respective user profile would prefer to visit over other places. The prioritized places list (user profile) 922 may be used by the mobile client devices 108 or the managing server 208 to aid in planning a route for the respective user profile that traverses a venue.

The popularity ranking (user profile) 924 may indicate the popularity of the respective user profile listing 902. As illustrated in FIG. 9, the popularity ranking (user profile) 924 may be a number that represents the ranking of the respective user profile listing 902 when compared to other user profiles within a given venue or within the user profile database 262 as a whole. For example, the user ID (user profile) 912 of "TigerFan01" in FIG. 9 may be the $17^{th}$ most popular user within the venue. In other embodiments, the popularity ranking (user profile) 924 may be a string that represents the popularity of the respective user profile listing 902 (e.g., "low", "medium", "high").

The busy action (user profile) 926 may represent the action to be taken by the mobile client device 108 that corresponds to the respective user profile listing 902 when the user is identified as busy (e.g., has set a "busy" indication on the mobile client device 108), but receives an action prompting a reaction, such as receiving a text message from another mobile client device 108 for example. The busy action (user profile) 926 may include responding with a text message or an email, as indicated in FIG. 9.

The broadcast message(s) (user profile) 928 may include a message which is continuously transmitted by the mobile client device 108 corresponding to the respective user profile listing 902 to other nearby devices. The broadcast message(s) (user profile) 928 may communicate something about the respective user profile listing 902 to other mobile client devices 108, such as user preferences or alerts regarding the venue.

The scheduled demonstrations (user profile) 930 may indicate if, and when, the respective user profile listing 902 is scheduled to attend demonstrations occurring within a venue. The schedule demonstrations (user profile) 930 may be used by the mobile client device 108 or the managing server 208 to aid in planning a route that traverses a venue for the mobile client device 108 corresponding to the respective user profile listing 902.

The special requests for speakers (user profile) 932 may indicate preferences of the user associated with the respective user profile listing 902 that be communicated to speakers/presenters who are within the vicinity of the mobile client device 108 corresponding to the respective user profile listing 902. The special request for speakers (user profile) 932 may be broadcast by the corresponding mobile client device 108 to alert mobile client devices 108 nearby that may correspond to user profile listings 902 of speakers/presenters.

The priority listing (user profile) 934 may indicate the priority of the respective user profile listing 902. This information may indicate how frequently the respective user profile listing 902 is updated, for example, or how well the respective user profile listing 902 is maintained. In some examples, such as the embodiment shown in FIG. 9, the priority listing (user profile) 934 may be a string that indicates the priority of the respective user profile listing 902. In alternate embodiments, the priority listing (user profile) 934 may be an integer, for example.

The listing of constraints (user profile) 936 may indicate additional information about the respective user profile listing 902, such as if the mobile client device 108 corresponding to the respective user profile listing 902 has technological or administrative limitations.

The languages (user profile) 938 may indicate which languages the mobile client device 108 associated with the respective user profile listing 902 can display. Alternatively, the languages (user profile) 938 may indicate which languages the patron associated with the respective user profile listing 902 can speak and/or understand.

The listing of disabilities (user profile) 940 may indicate any disabilities of the patron associated with the respective user profile listing 902. The listing of disabilities (user profile) 940 may be used by the mobile client device 108 or the managing server 208 to aid in planning a route through a venue to be traversed by the mobile client device 108 associated with the respective user profile listing 902.

FIG. 10 is an illustration of the traffic database 242, or a subset of the traffic database 242, according to example embodiments. The illustration of FIG. 10 may represent data stored within the memory 404 of the traffic database 242 or associated with the traffic database 242. The traffic database 242 may include a location listing 1002 associated with each location that is in the traffic database 242. Within each location listing 1002, there may be a places ID (traffic) 1012, a location in GPS coordinates (traffic) 1014, a location description (traffic) 1016, a range setting (traffic) 1018, a traffic duration times listing (traffic) 1020, a capacity listing (traffic) 1022, a popularity ranking (traffic) 1024, message pointers (traffic) 1026, content pointers (traffic) 1028, peak calendar times (traffic) 1030, scheduled demonstrations (traffic) 1032, special staffing and guest speakers (traffic) 1034, a featured ranking (traffic) 1036, a seasonal display (traffic) 1038, a priority listing (traffic) 1040, and a listing of constraints (traffic) 1042.

The places ID (traffic) 1012 may be an identifier assigned to each location listing 1002. The places ID (traffic) 1012 may be assigned by the mobile client devices 108, the managing server 208, or the traffic and capacity server 240, in various embodiments. The places ID (traffic) 512 may be used by the devices of the system 200 to retrieve traffic and capacity information regarding a particular location listing 1002. For example, a request to retrieve data regarding a particular location listing 1002 may be issued from one of the mobile client devices 108 to the traffic and capacity server 230 that uses the places ID (traffic) 1012 as header information in the request.

The location in GPS coordinates (traffic) 1014 may indicate the GPS position of the respective location listing 1002. In some embodiments, the location in GPS coordinates (traffic) 1014 may be given to 4 decimal places, as in the example embodiment of FIG. 10.

The location description (traffic) 1016 may be a description of the respective location listing 1002 that indicates what is happening within the system 200 at the geographic location associated with the respective location listing 1002. The location description (traffic) 1016 may be a searchable field by the mobile client devices 108 and/or the managing server 208, in certain embodiments.

The range setting (traffic) 1018 may indicate threshold distances from the geographic position associated with the respective location listing 1002. The range setting (traffic) 1018 may define one or more geofences 106 based on the geographic position of the respective proximity beacons 102 or GPS locations 104, for example.

The traffic duration times listing (traffic) 1020 may indicate the average duration that mobile client devices 108 spend at the geographic position associated with the respective location listing 1002. This information may be an amalgamation of information retrieved from mobile client devices 108 and/or population monitoring devices 110, for example. In the example embodiment of FIG. 10, there is a high amount of time (indicated by an 'H'), a medium amount of time (indicated by an 'M'), and a low amount of time (indicated by an 'L') for each traffic duration times listing (traffic) 1020. These varied times (high/medium/low), for example, may represent the $75^{th}$, $50^{th}$, and $25^{th}$ percentiles of duration times.

The capacity listing (traffic) 1022 may indicate how many patrons may occupy the respective location listing 1002. In the example embodiment of FIG. 10, the number of seats, standing spaces, and aisle spaces available at the respective location listing 1002 is indicated. The capacity listing (traffic) 1022 may be used by the managing server 208, in conjunction with information from the user profile database 262, for example, to determine how much seating remains at the respective places listing 502 at a given time.

The popularity ranking (traffic) 1024 may be an indication of the popularity of the respective location listing 1002. The popularity ranking (traffic) 1024 may be stored within the traffic database 242 as an integer, for example. In some embodiments, the popularity ranking (traffic) 1024 may be an actual ranking (i.e., all of the location listings within a given venue are ranked from most popular to least popular and then assigned integers indicating that popularity ranking). In other embodiments, the popularity ranking (traffic) 1024 may be a number that indicates popularity, but is less precise (i.e. two different location listings 1002 may have identical popularity rankings (traffic) 1024), such as an integer from one to ten. The popularity ranking (traffic) 1024 may be derived from user preferences listed in the user profile database 262 or based on past populations recorded by the managing server 208, the mobile client devices 108, or the population monitoring devices 110, for example.

The message pointers (traffic) 1026 may point to messages about traffic or capacity in the memory 404 of the traffic database 242 that is to be transmitted by the managing server 208 or the traffic and capacity server 240 to mobile client devices 108 upon the mobile client devices 108 entering a threshold geographic distance of the respective location listing 1002. In some embodiments, more than one pointer may be included in the message pointers (traffic) 1026. For example, one pointer may indicate the message that is to be transmitted to the mobile client devices 108 when they are 15 meters away from the respective location listing 1002 and another pointer may indicate the message that is to be transmitted to the mobile client devices 108 when they are 5 meters away from the respective location listing 1002.

The content pointers (traffic) 1028 may point to content in the memory 404 of the traffic database 242 that is associated with the respective location listing 1002. Such content may include metadata regarding current and historical traffic and capacity data or future traffic predictions associated with the respective location listing 1002. This information may be retrieved by the mobile client devices 108 when the mobile client devices 108 are geographically near the respective location listing 1002, for example.

The peak calendar times (traffic) 1030 may indicate what time the respective location listing 1002 is the busiest (populated by patrons). This peak calendar times (traffic) 1030 may be a measure that is based on historical data regarding the respective location listing 1002. The peak calendar times (traffic) 1030 may indicate one or more times a day, a month, or, as in the embodiment of FIG. 10, a year when the respective location listing 1002 is the most busy. This information may be used by the mobile client device 108 or the managing server 208 to aid in planning a route that traverses a venue, for example.

The scheduled demonstrations (traffic) 1032 may indicate if, and when, any demonstrations may be occurring at the respective location listing 1002. In some embodiments, the scheduled demonstrations (traffic) 1032 may additionally indicate if the demonstrations are recurring, and if so, how often they will occur (e.g. daily, monthly, yearly). Again, this information may be used by the mobile client device 108 or the managing server 208 to aid in planning a route that traverses a venue. Additionally, this information may aid the traffic and capacity server 240 in predicting future traffic at the geographic location of the respective location listing 1002.

The special staffing and guest speakers (traffic) 1034 may indicate if any special individuals and/or patrons are at the geographic location of the respective location listing 1002. The special staffing and guest speakers (traffic) 1034 may additionally include future times when special individuals and/or patrons will be at the geographic location of the respective location listing 1002. Again, this information may be used by the mobile client device 108 or the managing server 208 to aid in planning a route that traverses a venue or by the traffic and capacity server 240 in predicting future traffic at the geographic location of the respective location listing 1002.

The featured ranking (traffic) 1036 may indicate a temporary ranking established that highlights certain respective location listings 1002 within a venue. For example, if the relevant venue is a zoo, and it is currently "panda week", the location listing 1002 that is associated with the panda exhibit may have a higher featured ranking (traffic) 1036 than it would at other times throughout the year. The featured ranking (traffic) 1036 may be set by the managing server 208, one or more of the mobile client devices 108, or the places server 230, in various embodiments. Again, this information may be used by the mobile client device 108 or the managing server 208 to aid in planning a route that traverses a venue or by the traffic and capacity server 240 in predicting future traffic at the geographic location of the respective location listing 1002.

The seasonal display (traffic) 1038 may indicate a temporary display that is at the geographic location corresponding to the respective location listing 1002 at a certain time. For example, there may be a light display at a geographic location corresponding to one of the location listings 1002 during the month of December to celebrate the holidays.

The priority listing (traffic) 1040 may indicate the priority of the respective location listing 1002. This information may indicate how frequently the respective location listing 1002 is updated, for example. In some examples, such as the embodiment shown in FIG. 10, the priority listing (traffic) 1040 may be a string that indicates the priority of the respective places listing 1002. In alternate embodiments, the priority listing (traffic) 1040 may be an integer, for example.

The listing of constraints (traffic) 1042 may indicate any constraints that are present at the respective location listing 1002. Some example constraints may be reasons for closing, as illustrated in FIG. 10, non-handicap accessibility, only accepting cash for sales, etc. The listing of constraints (traffic) 1042 may also include factors affecting future traffic predictions associated with the respective location listing 1002. This information may be used by the mobile client device 108 or the managing server 208 to aid in planning a route that traverses a venue.

Figure 11:
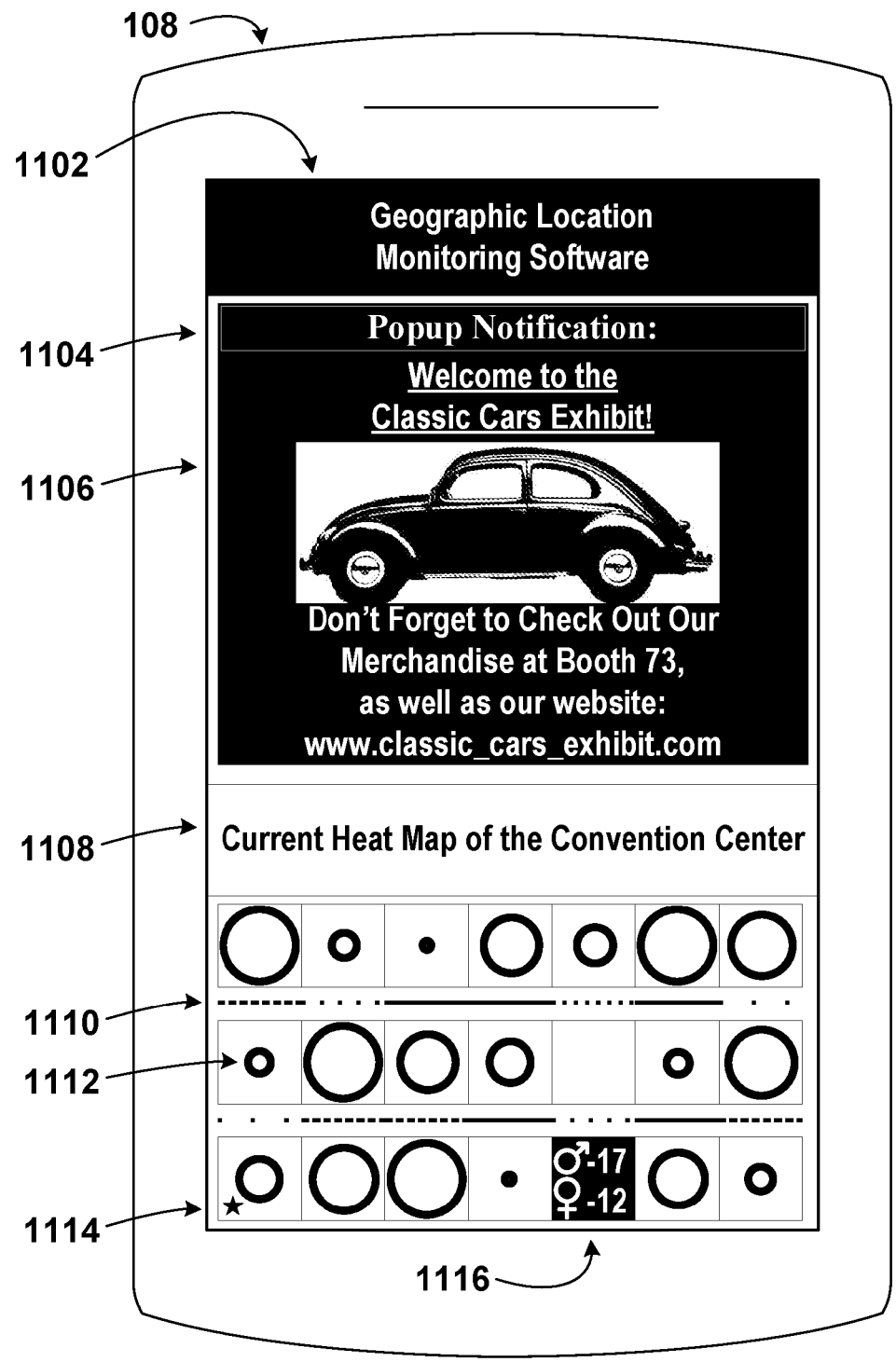
FIG. 11 is an illustration of a user interface, according to example embodiments.

FIG. 11 is an illustration of a user interface on the mobile client device 108, according to example embodiments. The user interface allows the mobile client device 108 to interact with the user by providing output and receiving input. The user interface may display a synthesized version of the information stored within the databases 212, 222, 232, 242, 252, 262 that provides a user with feedback regarding the state of the system 100. The user interface illustrated in FIG. 11 is only provided as an example. This example may be one of many interfaces displayed by the mobile client device 108 within the same embodiment or across multiple embodiments. In alternate embodiments, the user interface may include a routing map of a proposed route through the current venue, a messaging section for communicating with other mobile client devices 108, or a list of other users within the current venue.

Additionally, the user interface may be associated with one of many applications stored within a memory 404 of the mobile client device 108. Particularly, the user interface may be associated with the application that is configured to interact with the geographic location systems 100/200 illustrated in previous figures. The user interface may include, in some embodiments, an application title 1102, a popup notification (including a popup notification title 1104 and popup notification information 1106), and a live heat map (including a heat map title 1108, a traffic indicator 1110, a population indicator 1112, a current location indicator 1114, and a selected exhibit 1116).

The application title 1102 displays to a user the title of the application currently being executed by the processor 402 within the mobile client device 108. This provides feedback to a user to clarify that the geographic location monitoring application is presently being used.

The popup notification title 1104 may periodically be displayed during the execution of the geographic location monitoring application. It may appear when the mobile client device 108 is within a threshold distance of one of the proximity beacons 102 or GPS locations 106, such as one of the geofences 106, for instance. The popup notification data associated with the popup notification may be generated internally by the mobile client device 108 or may be received over the network 202 from another device, such as the managing server 208 or the user profile server 260.

The popup notification title 1104, itself, may be displayed by the mobile client device 108 to delineate the popup notification section of the user interface amongst other sections of the user interface. Within the popup notification title 1104 there may be additional information displayed, as well. Example additional pieces of information that may be displayed include the duration of the notification, the time at which the notification was first displayed, a button for closing the popup notification, and an indication of the relevance of the notification to the user.

The popup notification information 1106 may display information relative to the current geographic position of the mobile client device 108. In some embodiments this information is received over the network 202 from the managing server 208, the user profile server 260, the places server 230, the routes between places server 220, the traffic and capacity server 240, the venue maps server 210, the proximity beacons 102, or the scanner 204.

For example, upon the mobile client device 108 entering a venue, a welcome message with a venue map may be received from the venue maps server 210, or received from the managing server 208, and displayed within the popup notification information 1106. As another example, when the mobile client device 108 begins traversing a route that is temporarily closed or congested due to events like food spills on a walkway or large crowds standing in an aisle, the mobile client device 108 may display popup notification information 1106 indicating that the route is closed for a period of time and recommending an alternate route based on data received from the routes between places server 220. Still another example, the mobile client device 108 may receive and display, within the popup notification information 1106, an advertisement for a specific store from the places server 230 upon entering the geofence 106 associated with the respective store.

In the example of FIG. 11, the popup notification information 1106 provides users with a welcome message to a particular exhibit within a car show. This popup notification information 1106 may be displayed, for instance, when the mobile client device 108 comes within the geofence 106 that surrounds a proximity beacon 102 or GPS location 104 representing the "classic cars exhibit" within a car show. The popup notification information 1106 additionally provides a website that could be opened by a web-browser to display more information related to the popup notification information 1106.

The user interface may additionally display a heat map of the venue in which the mobile client device 108 is currently located. This heat map may provide a user with information regarding the population of other patrons within the venue. This information may aid in the selection of routes through the venue or preferred exhibits within the venue based on population density and/or population demographics.

The heat map title 1108 denotes which section of the user interface is dedicated to the heat map. Other information about the heat map, itself, may be additionally displayed within the heat map title 1108, such as the time at which the data used to generate the heat map was recorded, the last time the heat map was updated, or a legend that indicates how to read the heat map.

The traffic indicator 1110 may indicate the population density of patrons within given routes or walkways. In the example embodiment of FIG. 11, the density of the dots indicates how populated a given route is (i.e., the solid lines are routes that are very densely populated with patrons and the dotted lines are more sparsely populated with patrons). Color may additionally or alternatively be used to show population density within the routes. Furthermore, contour lines may be drawn to depict different threshold population densities along routes, in some embodiments.

In addition to the population density of routes within the venue, the rate at which patrons within the route are moving may also be displayed by the traffic indicators 1110. This information may be utilized by a user in real-time to decide which paths within a venue to take from one point to another.

The population indicator 1112 may show the population density of patrons at various attractions within the venue. In the example embodiment of FIG. 11, the squares within the heat map represent different booths within a trade show. The circles that are inside the squares represent the population density at each booth (the larger the circle, the more patrons are currently populating the respective booth; no circle indicates that no patrons are currently populating the respective booth or that the respective booth is temporarily closed). Color may additionally or alternatively be used to show population density within the various attractions. Furthermore, contour lines may be drawn to depict different threshold population densities at various attractions within the venue, in some embodiments.

Additional information about the populations in each region of the venue may be displayed by the population indicator 1112. As examples, the ratio of male to female patrons within a given region, the number of patrons that cheer for a particular sports team within a given region, the number of patrons who graduated from a particular university within a given region, the ratio of patrons affiliated with one political party to another within a given region, or the average age of patrons within a given region could all be displayed by one or more population indicators 1112.

The current location indicator 1114 may display on the mobile client device 108 user interface where the mobile client device 108 is currently located relative to the other objects in the heat map. The current location indicator 1114, in the example embodiment illustrated in FIG. 11, is denoted by a star symbol.

The current location indicator 1114 may be based on the geographic location of the mobile client device 108 the last time the mobile client device 108 transmitted an update to the managing server 208, in some embodiments. Alternatively, the mobile client device 108 may establish its current location based on GPS coordinates or its current distance from multiple proximity beacons 102. In other embodiments, the current location indicator 1114 may be based on the last geofence 106 crossed by the mobile client device 108.

The selected exhibit 1116 may be a specific geographic location that is selected by the mobile client device 108 based on a certain activity occurring at that geographic location at a specific time. Alternatively, the selected exhibit 1116 may be selected by a user. For example, the selected exhibit 1116 within the user interface of the mobile client device 108 may be highlighted by a user in order to obtain more information about the selected exhibit 1116. In the embodiment of FIG. 11, the selected exhibit 1116 provides more information about the demographics of the population at the corresponding geographic location. The provided information in FIG. 11 is the number of males and females at the corresponding geographic location. This information (the number of males and females at geographic locations) could alternatively or additionally be provided within the heat map for all of the exhibits at the venue, in various embodiments.

Figure 13:
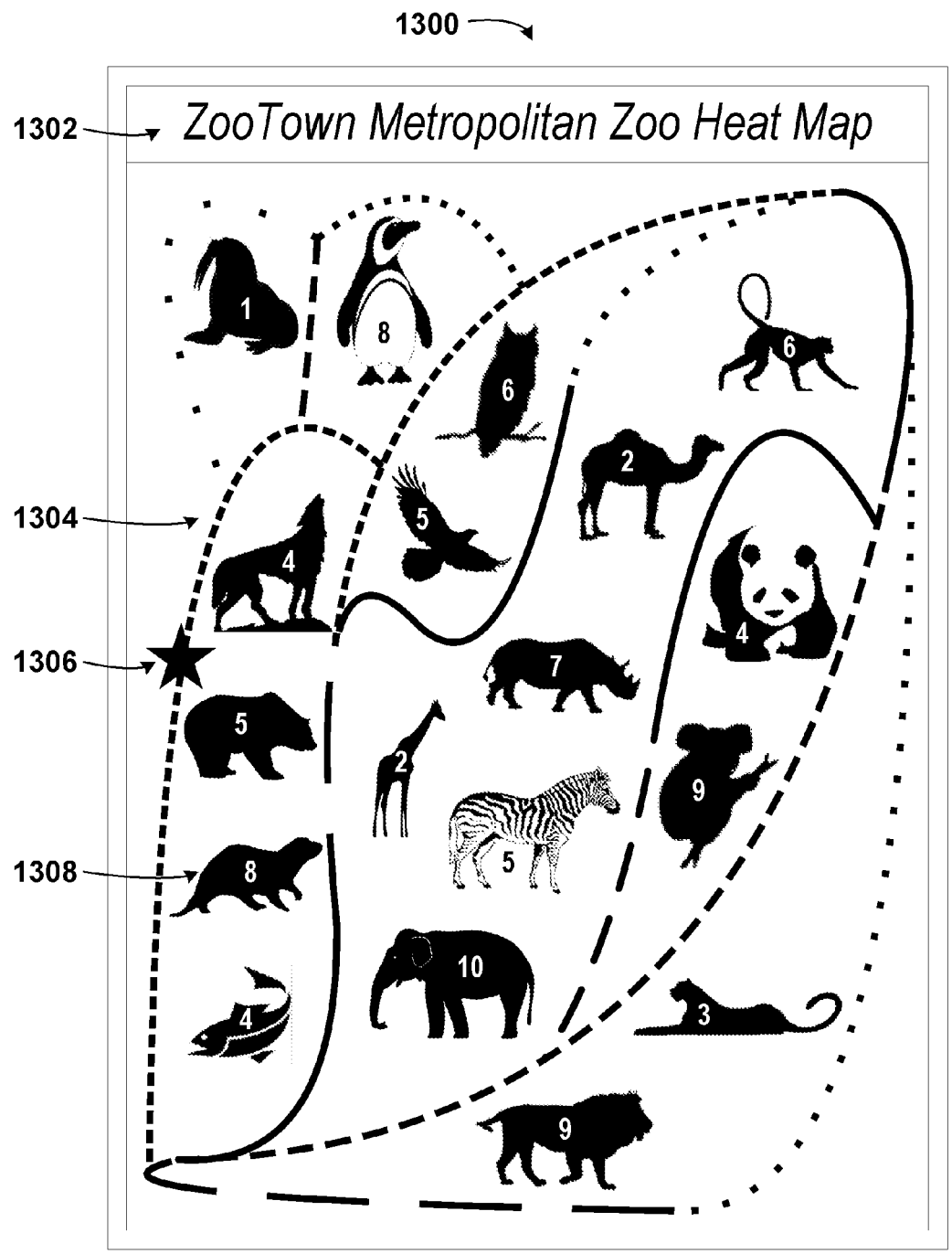
FIG. 13 is an illustration of a heat map, according to example embodiments.

For an alternate heat map which may be displayed by the mobile client device 108, please see FIG. 13 and accompanying description.

FIG. 12 is an illustration of a message transmission table 1200, according to example embodiments. The illustration of FIG. 12 may represent data stored within the memory 404 of the user profile database 262, the geographic location database 252, the places database 232, or a database associated with the managing server 208. The message transmission table 1200 aids in a determination by the managing server 208 of which messages to transmit to a mobile client device 108 based on the location of the mobile client device 108 relative to various geographic locations. The message transmission table 1200 may be stored in the same location as the geographic location database 252, or, alternatively, the message transmission table 1200 may represent additional columns for each of the geographic location listings 802 within the geographic location database 252.

The message transmission table 1200 may include a listing for each geographic location 1202 within the message transmission table 1200. Within each listing for geographic locations 1202, there may be a venue (message transmission) 1212, a location (message transmission) 1214, a major location (message transmission) 1216, a minor location (message transmission) 1218, a far distance message (message transmission) 1220, a near distance message (message transmission) 1222, an immediate distance message (message transmission) 1224, an exiting region message (message transmission) 1226, a low push notifications settings push notification (message transmission) 1228, a mid-level push notifications settings push notification (message transmission) 1230, a high push notifications settings push notification (message transmission) 1232, and a push notifications popup setting (message transmission) 1234.

The listing for each geographic location 1202 may represent one of the geographic locations that may be monitored by the mobile client devices 108 or the managing server 208. The geographic location 1202 may correspond to one of the proximity beacons 102 or one of the GPS locations 104.

The venue (message transmission) 1212 may indicate the venue that is associated with the listing for the respective geographic location 1202. For example, as shown in the embodiment of FIG. 12, the venue may be a trade show or a zoo.

The location (message transmission) 1214 may be a location within the venue of the listing for the respective geographic location 1202. The location may act as a title to identify where the listing for the respective geographic location 1202 is. The location (message transmission) 1214 may be established by the mobile client devices 108 or the managing server 208, for example. The location (message transmission) 1214 may be a field that is searchable by the mobile client devices 108 or the managing device 208 such that the mobile client devices 108 or the managing device 208 may retrieve messages from the message transmission table 1200 when one of the mobile client devices 108 comes within a threshold distance of one of the listings for the geographic locations 1202.

The major location (message transmission) 1216 may describe the larger, generally identifiable, region of the venue in which the listing for the respective geographic location 1202 is located. For example, the major location (message transmission) 1216 may be the western half of the stadium or the top floor of the shopping mall.

The minor location (message transmission) 1218 may provide a more detailed subregion of the venue, located within the major location (message transmission) 1216, where the respective geographic location 1202 is located. In reference to the previous two examples, the minor location (message transmission) 1218 may be the northwestern corner of the stadium or the southern half of the top floor of the shopping mall.

The far distance message (message transmission) 1220 may indicate the message that should be displayed by a mobile client device 108 upon the mobile client device 108 entering a far threshold distance, such as 15 meters, from the respective geographic location 1202. The far distance message (message transmission) 1220 may be retrieved by the mobile client device 108 or the managing server 208, upon the mobile client device 108 entering the far threshold distance, for example.

The near distance message (message transmission) 1222 may indicate the message that should be displayed by a mobile client device 108 upon the mobile client device 108 entering a near threshold distance, such as 10 meters, from the respective geographic location 1202. The near distance message (message transmission) 1222 may be retrieved by the mobile client device 108 or the managing server 208, upon the mobile client device 108 entering the near threshold distance, for example.

The immediate distance message (message transmission) 1224 may indicate the message that should be displayed by a mobile client device 108 upon the mobile client device 108 entering a very near threshold distance, such as 1 meter, from the respective geographic location 1202. The immediate distance message (message transmission) 1224 may be retrieved by the mobile client device 108 or the managing server 208, upon the mobile client device 108 entering the immediate threshold distance, for example.

The exiting region message (message transmission) 1226 may indicate the message that should be displayed by a mobile client device 108 upon the mobile client device 108 leaving all distance thresholds (e.g. greater than 15 meters away) after being within a threshold distance from the respective geographic location 1202. The exiting region message (message transmission) 1226 may be retrieved by the mobile client device 108 or the managing server 208, upon the mobile client device 108 exiting the region, for example.

The low push notifications settings push notification (message transmission) 1228 may indicate the push notification, if any, that should be displayed by the mobile client device 108 upon the mobile client device 108 entering a threshold distance of the respective geographic location 1202 if the user preferences associated with the mobile client device 108 have the push notifications settings set to "low". This threshold distance may be, but need not be, the same as one of the threshold distances (e.g., far, near, immediate) previously stated. The low push notifications settings push notification (message transmission) 1228 may be retrieved by the mobile client device 108 or the managing server 208, upon the mobile client device 108 entering the threshold distance, for example.

The mid-level push notifications settings push notification (message transmission) 1230 may indicate the push notification, if any, that should be displayed by the mobile client device 108 upon the mobile client device 108 entering a threshold distance of the respective geographic location 1202 if the user preferences associated with the mobile client device 108 have the push notifications settings set to "medium". This threshold distance may be, but need not be, the same as one of the threshold distances (e.g., far, near, immediate) previously stated. The mid-level push notifications settings push notification (message transmission) 1230 may be retrieved by the mobile client device 108 or the managing server 208, upon the mobile client device 108 entering the threshold distance, for example.

The high push notifications settings push notification (message transmission) 1232 may indicate the push notification, if any, that should be displayed by the mobile client device 108 upon the mobile client device 108 entering a threshold distance of the respective geographic location 1202 if the user preferences associated with the mobile client device 108 have the push notifications settings set to "high". This threshold distance may be, but need not be, the same as one of the threshold distances (e.g., far, near, immediate) previously stated. The high push notifications settings push notification (message transmission) 1232 may be retrieved by the mobile client device 108 or the managing server 208, upon the mobile client device 108 entering the threshold distance, for example.

The push notifications popup setting (message transmission) 1234 may indicate whether any of the above referenced push notifications should popup when displayed by the mobile client device 108 (i.e., if the push notifications should be displayed on top of anything else that is occurring within the user interface of mobile client device 108 when the push notifications are displayed). In alternate embodiments, the push notifications popup setting (message transmission) 1234 may be a decision with a range of options depending on the type of push notification, rather than the binary option of "yes" vs. "no" presented in the example embodiment of FIG. 12.

FIG. 13 is an illustration of a heat map 1300, according to example embodiments. The example heat map 1300 illustrated in FIG. 13 is of a zoo that houses multiple animal exhibits. The exhibits may be defined by geofences 106, for example. The heat map 1300 may be printed by one of the printers 206 or may be displayed within a user interface on the mobile client device 108, similar to FIG. 11. The heat map 1300 may include a heat map title 1302, traffic indicator 1304, current location indicator 1306, and population indicators 1308 for various locations.

The heat map title 1302 indicates to a viewer what the printed map displays or what is currently being displayed on the mobile client device 108. The heat map title 1302 may include more information, in some embodiments, such as when it was printed or, if it is a future projected heat map 1300, the confidence level of the projected heat map 1300 and what time period the projected heat map 1300 should be relevant.

The traffic indicators 1304 is analogous to the traffic indicators 1110 displayed in FIG. 10 (the density of the dots along various routes indicate the density of traffic). The traffic indicators 1304 may be a synthesis of information from the mobile client devices 108, the population monitoring devices 110, the routes between places database 222, and the traffic database 242, for example.

Color may additionally or alternatively be used to indicate traffic density or the rate at which traffic is progressing. In some embodiments, contour lines may be drawn to depict different traffic conditions. Furthermore, the traffic indicators 1302 may indicate the predominate flow of traffic within a given route of the venue, thereby indicating the preferred direction, by patrons within the venue, to traverse the respective route. In addition, the traffic indicators 1304 may also indicate other route alerts, such as construction or route closing that completely removes a route from use.

The current location indicator 1306 is analogous to the current location indicator 1114 illustrated in FIG. 11. If the heat map of FIG. 13 were a printed heat map 1300, the current location indicator 1306 may not be printed on the heat map 1300, as it would not necessarily be relevant as the respective patron tours the venue. In other embodiments, the current location indicator 1306 may still be printed on the heat map 1300 with a timestamp that indicates the time at which the heat map 1300 was printed or a printer location indicator that indicates the location of the printer 206 that was used to print the heat map 1300.

The population indicators 1308 are analogous to the population indicators 1112 illustrated in FIG. 11. In the example embodiment of FIG. 13, however, the population indicators 1308 are numerals from one to ten that indicate the population for each exhibit within the zoo. Hence, the exhibits with lower numbers, such as the walrus and the giraffe, are less populated than those with higher numbers, such as the lion and elephant. These numerals may indicate physical populations (e.g., the number '5' represents 500 patrons viewing the respective exhibit).

In alternate embodiments, the population indicators 1308 could have a numeral that identifies the population rank among all the exhibits. For example, a very popular exhibit, such as the elephant exhibit, may be ranked number one in terms of patron population at a given time, and thereby assigned the numeral '1' as its population indicator 1308, whereas the unpopular walrus may have the lowest population amongst all zoo animal exhibits, and thereby assigned the numeral '18' as its population indicator 1308.

In still other embodiments, the population indicators 1308 may be numerals that indicate a percentage of all patrons within the respective venue (the zoo, using the example of FIG. 13) that are at a given geographic location. For example, if there are 2500 patrons at the zoo at a given time, and 250 of those patrons are within the geofence 106 that defines the koala exhibit, the koala may have a population indicator 1308 of '0.1'. The population indicators 1308 may alternatively indicate a percentage of the given geographic location that is occupied (e.g., "95%" may represent that 95% of the available seats in a given geographic location are occupied).

Additionally or alternatively, color may be used as the population indicators 1308 to indicate how densely populated various regions within the venue are. Furthermore, in some embodiments, contour lines may be used as the population indicators 1308, and may be drawn to depict different threshold population densities within the venue. Still further, the population indicators 1308 may represent population information about a subset of patrons within the venue (e.g., the population distribution of men within the venue, the population distribution of children within the venue, or the population distribution of police officers within the venue).

Additional information may be provided on the heat map 1300 in other embodiments, such as typical low-population times at various exhibits based on past data, special presentations to be given by special guests at certain times at certain exhibits, and alternate routes to take between geographic locations on the map when the common routes have high population densities/traffic levels.

Figure 14A:
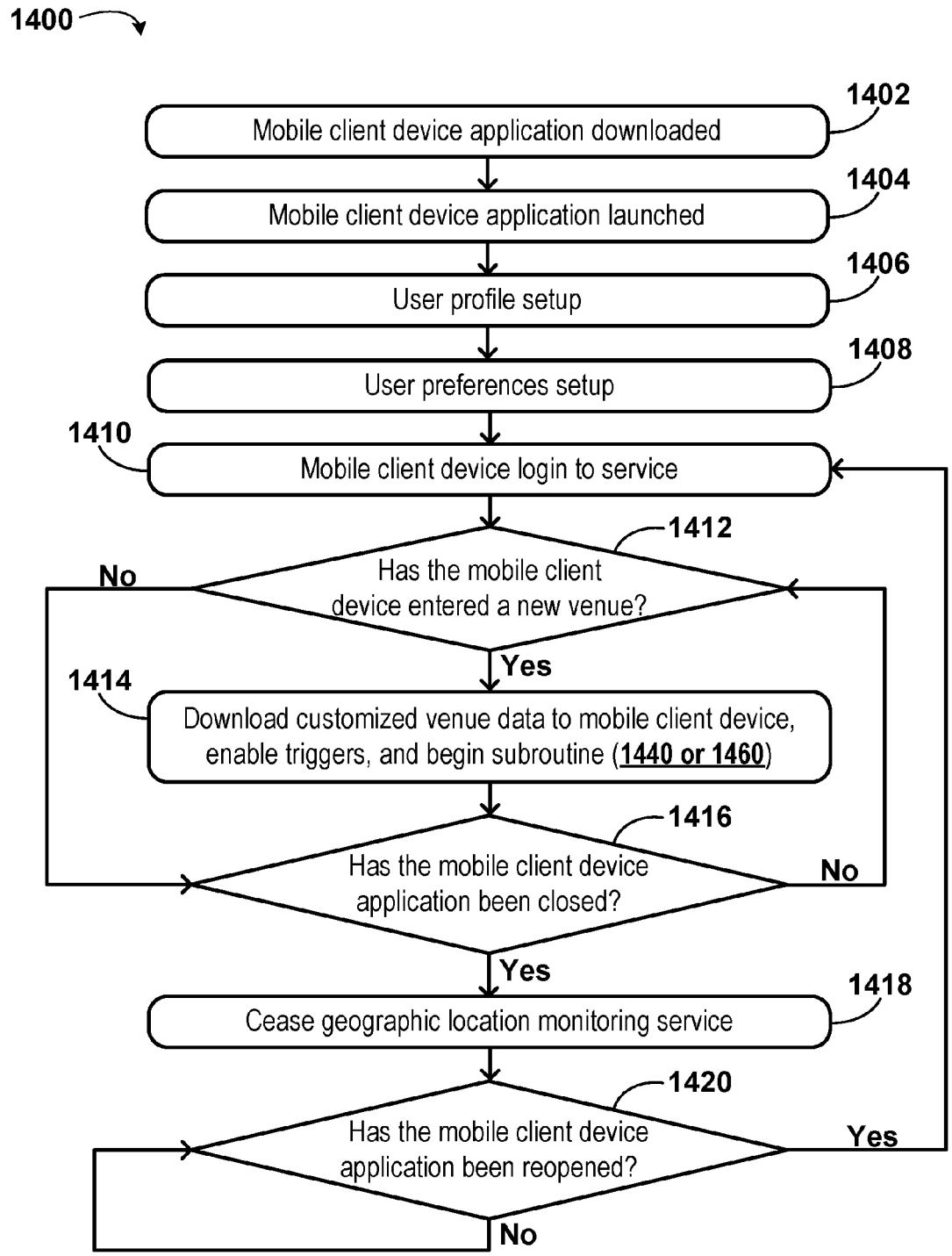
FIG. 14a is a flow chart illustration of a method, according to example embodiments.

FIG. 14a is a flow chart illustration of a method 1400, according to example embodiments. The method 1400 may be completed by various components of the system 200 to enable the mobile client device 108 to monitor its geographic location relative to proximity beacons 102, GPS locations 104, and geofences 106. The monitoring loop occurs within the method 1400 during sub-methods 1440 and 1460.

At step 1402, the method 1400 includes the mobile client device 108 downloading an application that configures the mobile client device 108 to monitor its geographic location and communicate with other devices in the system 200 over the network 202. Step 1402 may include the mobile client device 108 retrieving the application from a repository associated with a server, such as a cloud server or the managing server 208. Upon retrieving the application, the mobile client device 108 may also store the application in the memory 404 of the mobile client device 108. Step 1402 may further include the mobile client device 108 installing the application.

At step 1404, the method 1400 includes the mobile client device 108 launching the application. This may include the mobile client device 108 transferring the application, or parts of it, from non-volatile memory (e.g., read-only memory—ROM) to volatile memory (e.g., random access memory—RAM). Step 1404 may also include the processor 402 of the mobile client device 108 executing the application.

In some embodiments, if the user associated with the mobile client device 108 had previously setup a profile within the geographic location monitoring service, the following two steps of method 1400, 1406 and 1408, may be neglected.

At step 1406, the method 1400 includes the mobile client device 108 setting up an associated user profile. This may involve the mobile client device 108 creating a new entry within the user profile database 262 (i.e., creating a new user profile listing 902 associated with a new user ID 912 and password). This creation may be done using a utility within the application launched in step 1404, in some embodiments. In alternate embodiments, this may be done using a web-browser interface. The user profile associated with the mobile client device 108 may be the only user profile associated with that mobile client device 108 or it may be one of many user profiles associated with the mobile client device 108.

Further, at 1406 the method 1400 may also include providing personalized user demographic information, such as age, sex, height, weight, favorite sports team, favorite animal, etc. This information may be later used by the mobile client device 108 or by the managing server 208 to provide more personalized content to the mobile client device 108. Some of the information illustrated in FIG. 9 (included within a user profile listing 902) may be setup during step 1406 of method 1400.

At step 1408, the method 1400 includes the setup of user preferences by the mobile client device 108. These user preferences may include printing preferences, scanning preferences, preferences about notification frequency on the respective mobile client device 108, preferences regarding how and when notifications are displayed on the respective mobile device 108, visibility of the corresponding user profile to other users in a venue, heat map and/or routing map display preferences, etc. Some of the information illustrated in FIG. 9 (included within a user profile listing 902) may be setup during step 1408 of method 1400.

At step 1410, the method 1400 includes the mobile client device 108 logging into the geographic location monitoring service. This service may be hosted locally on the mobile client device 108. Alternatively, the service may be hosted by a server on the network 202, such as the managing server 208, or hosted on a cloud server. The login of step 1410 may occur by the entity that is hosting the service retrieving user profile information from the user profile database 262 and comparing that information to the credentials provided by the mobile client device 108. Upon verification of the login credentials, the mobile client device 108 may display a login completion notification or a "home" interface.

At step 1412, the method 1400 includes determining if the mobile client device 108 has entered a new venue. If the mobile client device 108 has entered a new venue, the method 1400 proceeds to step 1414. If the mobile client device 108 has not entered a new venue, the method 1400 proceeds to step 1416.

The determination of step 1412 may be made by the mobile client device 108, itself. Upon entering a new venue, the mobile client device may recognize that it is in a large geographic area (venue) that it has never been in before based on the GPS coordinates of the venue or the proximity beacons 102 nearby. Alternatively, upon entering a new venue, the mobile client device 108 may receive input from a user that indicates that the mobile client device has entered a new venue. If either occur, the mobile client device 108 establishes that it has entered a new venue.

In alternate embodiments, the managing server 208 may determine whether the mobile client device 108 has entered a new venue. For example, the managing server 208 may receive updates from one or more of the population monitoring devices 110 each time a new mobile client device 108 has entered the venue. Additionally, or alternatively, when a mobile client device 108 enters a venue, the user profile server 260 may update the user profile database 262 indicating the current venue of the respective user profile associated with the mobile client device 108. This information may be passed on to the managing server 208. In other embodiments, the mobile client device 108 may alert nearby mobile client devices that they are within proximity of one another. If the mobile client device 108 is new to the venue, the alerted nearby mobile client devices may notify the managing server 208 of the mobile client device 108 that is new to the venue.

Figure 14B:
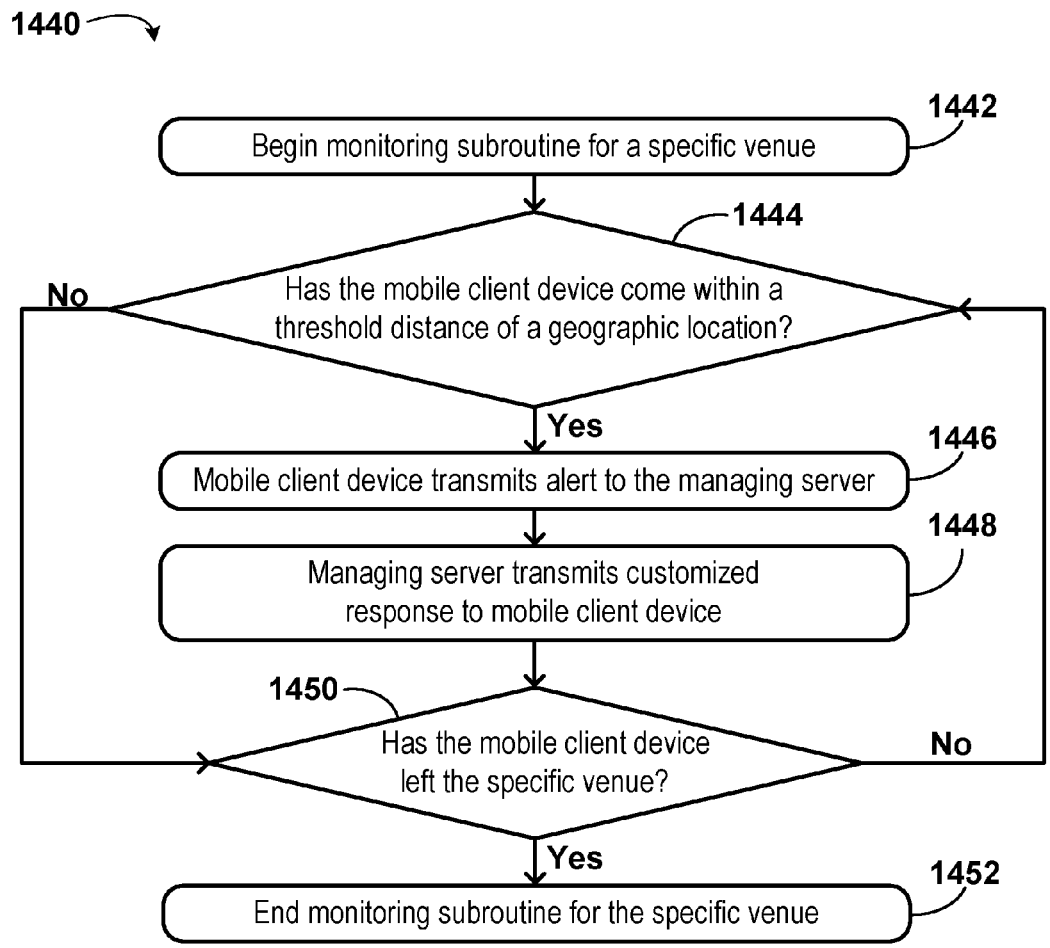
FIG. 14b is a flow chart illustration of a sub-method, according to example embodiments.

At step 1414, the method 1400 includes the mobile client device 108 downloading customized venue data, enabling triggers that occur with respect to the data and beginning subroutine 1440 or subroutine 1460 (please see FIG. 14b and the accompanying description for more information regarding subroutines 1440 and 1460). The data downloaded to the mobile client device 108 may come from the managing server 208, other mobile client devices 108, or any of the databases 212, 222, 232, 242, 252, 262. The data may include maps, schedules, user profiles, geographic locations, route information, etc.

Enabling triggers by the mobile client device 108 includes the mobile client device 108 establishing when certain triggers should occur and what should be done in response to those triggers. For example, one trigger may be set to occur when the mobile client device 108 is within the geofence 106 of a certain proximity beacon 102. Upon crossing the threshold of that geofence 106, the mobile client device 108 is set to issue a popup notification stating that the mobile client device 108 is nearby the respective proximity beacon 120.

At step 1416, the method 1400 includes determining if the geographic location monitoring application has been closed on the mobile client device 108. If the geographic location monitoring application has been closed on the mobile client device 108, the method 1400 proceeds to step 1418. If it has not been closed, the method returns to step 1412.

Determining if the geographic location monitoring application has been closed on the mobile client device 108 may be performed by the mobile client device 108 or the managing server 208, in various embodiments. For example, the mobile client device 108 may monitor the processes currently being executed by the processor 402 or the processes that are currently stored within a volatile section of the memory 404 of the mobile client device 108.

Alternatively, the managing server 208 may transmit a message to the mobile client device 108 to ascertain whether the geographic location monitoring application has been closed. If the application has been closed, the mobile client device 108 may respond with a message indicating that it has been closed, or it may not respond at all. If the mobile client device 108 does not respond within a certain period of time, a time-out may occur within the managing server 208, and the managing server 208 may make the determination that the geographic location monitoring application has been closed on the mobile client device 108.

At step 1418, the method 1400 includes ceasing the geographic location monitoring service on the mobile client device 108. This may occur by suspending communications between the mobile client device 108 and one or more other devices within the system 200. In addition, the mobile client device 108 may power down to conserve energy. Powering down may include the mobile client device 108 turning off or the mobile client device 108 deactivating certain features, such as Bluetooth® communications, WiFi® communications or GPS communications.

In some embodiments, step 1418 may also include the managing server 208 or the user profile server 260 removing the mobile client device 108 and associated user profile(s) from the user profile database 262. This may occur to conserve memory 404 within the user profile database 262.

At step 1420, the method 1400 includes determining if the geographic location monitoring application has been reopened on the mobile client device 108. If the geographic location monitoring application has been reopened on the mobile client device 108, the method 1400 returns to step 1410. If the geographic location monitoring application has not been reopened on the mobile client device 108, the method returns to the beginning of step 1420. Thus, this loop (repeatedly determining if the geographic location monitoring application has been reopened on the mobile client device 108, i.e. performing step 1420 of method 1400) may continue indefinitely until the geographic location monitoring application has been reopened on the mobile client device 108.

In some embodiments, step 1420 will be performed by the managing server 208. For example, the managing server 208 may ping the mobile client device 108 periodically to check if the geographic monitoring location application has been reopened. In alternate embodiments, step 1420 may be performed by the mobile client device 108. If, for example, the mobile client device 108 begins to execute the geographic location monitoring application stored within the memory 404 using the processor 402, the mobile client device 108 may issue an alert to other devices within the system 200 indicating that it is "back online" (i.e., returning to participation in the geographic location monitoring of the system 200).

FIG. 14*b* is a flow chart illustration of a sub-method 1440, according to example embodiments. The sub-method 1440 performs monitoring of the mobile client device 108 upon the mobile client device 108 entering a new venue.

At step 1442, the sub-method 1440 includes beginning the monitoring sub-method 1440 (subroutine) for the specific venue associated with the mobile client device 108. Step 1442 may include the mobile client device 108 executing a sub-method that is stored within the memory 404 of the mobile client device 108 using the processor 402 of the mobile client device 108. In some embodiments, the sub-method 1440 may be a portion of the code that represents the geographic location monitoring application.

In other embodiments, the sub-method 1440 may be an entirely separate set of instructions that are stored within the memory 404 of the mobile client device 108. In still other embodiments, the sub-method 1440 may vary among venues and be stored on the managing server 208, for example. In this case, the mobile client device 108 may need to download the instructions that represent the sub-method 1440 from the managing server 208 in step 1442. The sub-routine 1440 may alternatively be executed by the processor 402 included in the managing server 208.

At step 1444, the sub-method 1440 includes determining if the mobile client device 108 has come within a threshold distance of a geographic location. If the mobile client device 108 has come within a threshold distance of a geographic location, the sub-method 1440 proceeds to step 1446. If the mobile client device 108 has not come within a threshold distance of a geographic location, the sub-method 1440 proceeds to step 1450.

Step 1444 may be performed by the mobile client device 108 or the managing server 208, in various embodiments. The geographic location may be indicated by one of the proximity beacons 102 or one of the GPS locations 104. In addition, the corresponding threshold distance may be one of the geofences 106.

Determining whether the mobile client device 108 has come within a threshold distance of a geographic location may include the mobile client device 108 or the managing server 208 comparing the current GPS coordinates of the mobile client device 108 with the GPS coordinates 104 of designated geographic locations, in some embodiments. In other embodiments, the determination of step 1444 may include the mobile client device 108 or the managing server 208 comparing the current GPS coordinates or coordinates within a venue of the mobile client device 108 with the GPS coordinates or coordinates within a venue that define designated geofences 106. In still other embodiments, the determination of step 1444 may include the mobile client device 108 measuring the power associated with broadcasts received from designated proximity beacons 102.

At step 1446, the sub-method 1440 includes the mobile client device 108 transmitting an alert to the managing server 208. This alert may indicate, in various embodiments, the current coordinates within a venue or GPS coordinates of the mobile client device 108. The alert may also indicate for which of the respective geographic locations (of the geographic locations stored within the geographic location database 252, for example) the mobile client device 108 is within the threshold distance. Furthermore, the threshold distance may be defined and/or stored within the places database 232, the geographic location database 252, the user profile database 262, the managing server 208, or the mobile client device 108.

At step 1448, the sub-method 1440 includes the managing server 208 transmitting a customized response to the mobile client device 108. The customized response may, in some embodiments, be personalized based on information in the user profile database 262. In addition, the customized response may include print data to be printed by the printer 206, a popup notification, a push notification, an image to be displayed by the mobile client device 108, a heat map to be displayed by the mobile client device 108, an advertisement, a message, or a web-address.

The customized response may be dependent on information received by the managing server 208 from the mobile client device 108 regarding the geographic location(s) that were nearby the mobile client device 108. The customized response may also be based on information stored within any or all of the databases 212, 222, 232, 242, 252, 262.

At step 1450, the sub-method 1440 includes determining if the mobile client device 108 has left the specific venue for which it was being monitored. If the mobile client device 108 has left the specific venue, the sub-method 1440 proceeds to step 1452. If the mobile client device 108 has not left the specific venue, the sub-method 1440 returns to step 1444.

Step 1450 may be performed, in some embodiments, by the mobile client device 108. The mobile client device 108, for example, may check the current GPS coordinates of the mobile client device 108 and compare them with the GPS coordinates that bound the present venue. If the current GPS coordinates of the mobile client device 108 are outside the bounds of the present venue, the mobile client device 108 may transmit a message to the managing server 208 to indicate that the mobile client device 108 is no longer in the venue.

In other embodiments, a flag may be set by the mobile client device 108 (either within the mobile client device 108, the managing server 208, or the user profile database 262) whenever the mobile client device 108 leaves a specific venue. This flag may indicate to the managing server 208 or other mobile client devices that the mobile client device 108 is not within the present venue.

In still other embodiments, the managing server 208 may compare the last known geographic location of the mobile client device 108, either determined by GPS position or by location relative to certain places within the venue (venue coordinates), to the bounds of the venue. If the last known location is outside of the bounds of the venue, the managing server 208 may determine that the mobile client device 108 is no longer in the venue.

Additionally or alternatively, the managing server 208 may ping the mobile client device 108 to receive the current location of the mobile client device 108. The mobile client device 108 may respond with the current location of the mobile client device 108 (either by GPS position or venue coordinates). If the mobile client device 108 does not respond within a predetermined amount of time, the managing server 208 may initiate a "time-out" and therefore presume that the mobile client device 108 is either out of range or powered down. This would indicate to the managing server 208 that the mobile client device 108 is no longer in the venue.

At step 1452, the sub-method 1440 includes ending the monitoring sub-method 1440 (subroutine) for the specific venue. Step 1452 may include the devices of the system 100 no longer monitoring/communicating with the mobile client device 108. Step 1452 may also include the location of the mobile client device 108 being updated within the user profile database 262 or the managing server 208.

If the mobile client device 108 left the specific venue for an alternate venue, step 1452 may also include the mobile client device 108 initiating a sub-method 1440 for a different venue. Alternatively, a sub-method 1440 for a different venue may be initiated within the managing server 208 with respect to the mobile client device 108.

Figure 14C:
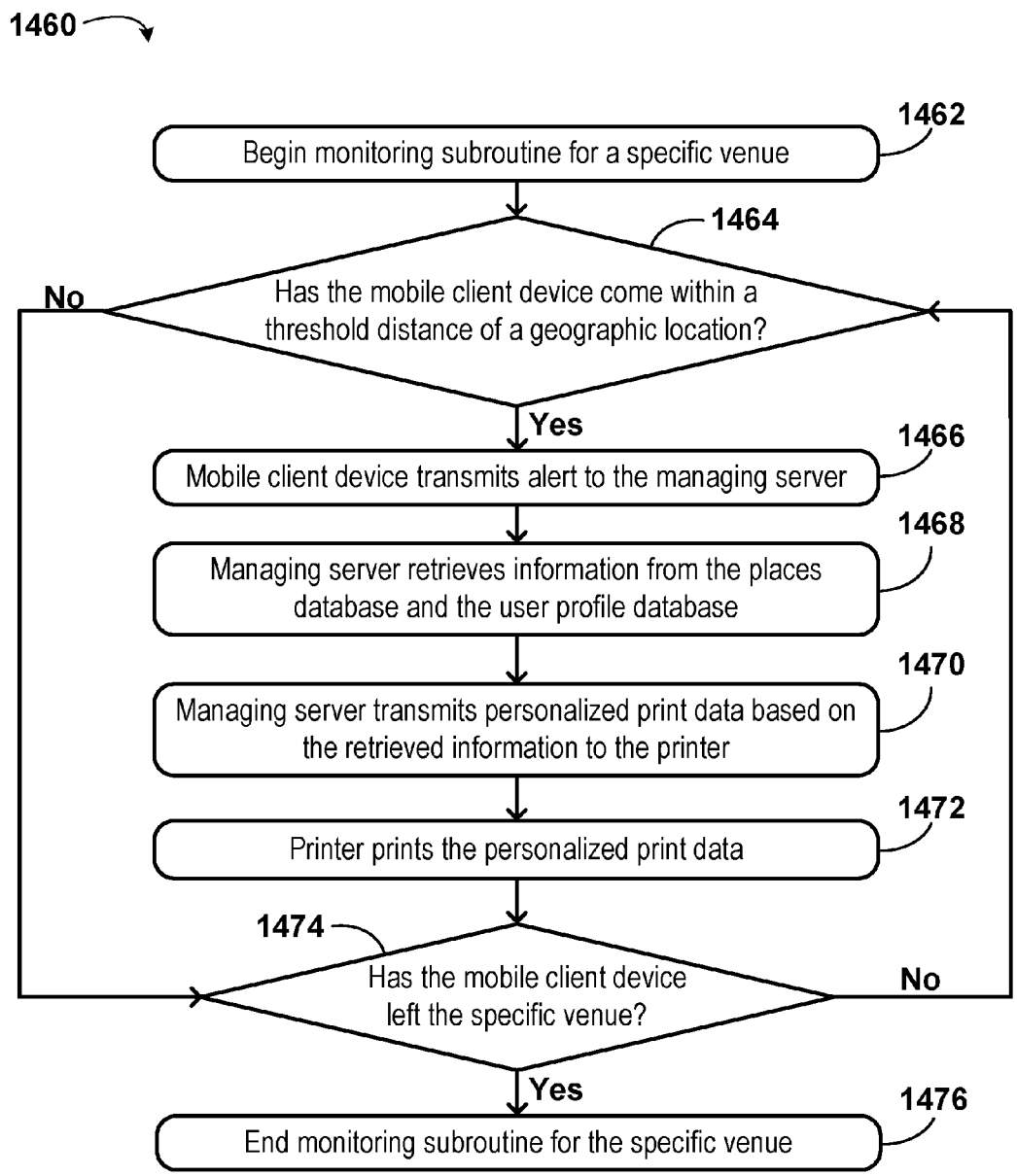
FIG. 14c is a flow chart illustration of another sub-method, according to example embodiments.

FIG. 14c is a flow chart illustration of a sub-method 1460, according to example embodiments. The sub-method 1460 performs monitoring of the mobile client device 108 upon the mobile client device 108 entering a new venue.

At step 1462, the sub-method 1460 includes beginning the monitoring sub-method 1460 (subroutine) for a specific venue. Step 1462 may include the mobile client device 108 executing a sub-method that is stored within the memory 404 of the mobile client device 108 using the processor 402 of the mobile client device 108. In some embodiments, the sub-method 1460 may be a portion of the instructions that represent the geographic location monitoring application.

In other embodiments, the sub-method 1460 may be an entirely separate set of instructions that are stored within the memory 404 of the mobile client device 108. In still other embodiments, the sub-method 1460 may vary among venues and be stored on the managing server 208, for example. In this case, the mobile client device 108 may need to download the instructions that represent the sub-method 1460 from the managing server 208 in step 1462. The sub-routine 1460 may alternatively be executed by the processor 402 included in the managing server 208.

At step 1464, the sub-method 1460 includes determining if the mobile client device 108 has come within a threshold distance of a geographic position corresponding to a geographic location. If the mobile client device 108 has come within a threshold distance, the sub-method 1460 proceeds to step 1466. If the mobile client device 108 has not come within a threshold distance, the sub-method proceeds to step 1474.

Step 1464 may be performed by the mobile client device 108 or the managing server 208, in various embodiments. The geographic location may be indicated by one of the proximity beacons 102 or one of the GPS locations 104. In addition, the corresponding threshold distance may be one of the geofences 106.

Determining whether the mobile client device 108 has come within a threshold distance of a geographic location may include the mobile client device 108 or the managing server 208 comparing the current GPS coordinates of the mobile client device 108 with the GPS coordinates 104 of designated geographic locations, in some embodiments. In other embodiments, the determination of step 1464 may include the mobile client device 108 or the managing server 208 comparing the current GPS coordinates or coordinates within a venue of the mobile client device 108 with the GPS coordinates or coordinates within a venue that define designated geofences 106. In still other embodiments, the determination of step 1464 may include the mobile client device 108 measuring the power associated with broadcasts received from designated proximity beacons 102.

At step 1466, the sub-method 1460 includes the mobile client device 108 transmitting an alert to the managing server 208. This alert may indicate, in various embodiments, the current coordinates within a venue or GPS coordinates of the mobile client device 108. The alert may also indicate for which of the respective geographic locations (of the geographic locations stored within the geographic location database 252, for example) the mobile client device 108 is within the threshold distance. Furthermore, the threshold distance may be defined and/or stored within the places database 232, the geographic location database 252, the user profile database 262, the managing server 208, or the mobile client device 108.

At step 1468, the sub-method 1460 includes the managing server 208 retrieving information from the places database 232, geographic location database 252, and the user profile database 262. Step 1468 may include the managing server 208 sending a query to the places server 230, the geographic location server 250, or the user profile server 260. The query may include information received in or related to the alert transmitted by the mobile client device 108 in step 1466.

At step 1470, the sub-method 1460 includes the managing server 208 transmitting personalized printout data based on the retrieved information of step 1468 to the printer 206. Step 1470 may include a transformation of the print data using a printer driver prior to transmission by the managing server 208.

At step 1472, the sub-method 1460 includes the printer printing the personalized print data received in step 1470.

At step 1474, the sub-method 1460 includes determining if the mobile client device 108 has left the specific venue. If the mobile client device 108 has left the specific venue, the sub-method 1460 proceeds to step 1476. If the mobile client device 108 has not left the specific venue, the sub-method 1460 returns to step 1464.

Step 1474 may be performed, in some embodiments, by the mobile client device 108. The mobile client device 108, for example, may check the current GPS coordinates of the mobile client device 108 and compare them with the GPS coordinates that bound the present venue. If the current GPS coordinates of the mobile client device 108 are outside the bounds of the present venue, the mobile client device 108 may transmit a message to the managing server 208 to indicate that the mobile client device 108 is no longer in the venue.

In other embodiments, a flag may be set by the mobile client device 108 (either within the mobile client device 108, the managing server 208, or the user profile database 262) whenever the mobile client device 108 leaves a specific venue. This flag may indicate to the managing server 208 or other mobile client devices that the mobile client device 108 is not within the present venue.

In still other embodiments, the managing server 208 may compare the last known geographic location of the mobile client device 108, either determined by GPS position or by location relative to certain places within the venue (venue coordinates), to the bounds of the venue. If the last known location is outside of the bounds of the venue, the managing server 208 may determine that the mobile client device 108 is no longer in the venue.

Additionally or alternatively, the managing server 208 may ping the mobile client device 108 to receive the current location of the mobile client device 108. The mobile client device 108 may respond with the current location of the mobile client device 108 (either by GPS position or venue coordinates). If the mobile client device 108 does not respond within a predetermined amount of time, the managing server 208 may initiate a "time-out" and therefore presume that the mobile client device 108 is either out of range or powered down. This would indicate to the managing server 208 that the mobile client device 108 is no longer in the venue.

At step 1476, the sub-method 1460 includes ending the monitoring sub-method 1460 for the specific venue. Step 1476 may include the devices of the system 100 no longer monitoring/communicating with the mobile client device 108. Step 1476 may also include the location of the mobile client device 108 being updated within the user profile database 262 or the managing server 208.

If the mobile client device 1452 left the specific venue for an alternate venue, step 1476 may also include the mobile client device 108 initiating a sub-method 1460 for a different venue. Alternatively, a sub-method 1460 for a different venue may be initiated within the managing server 208 with respect to the mobile client device 108.

Figure 15:
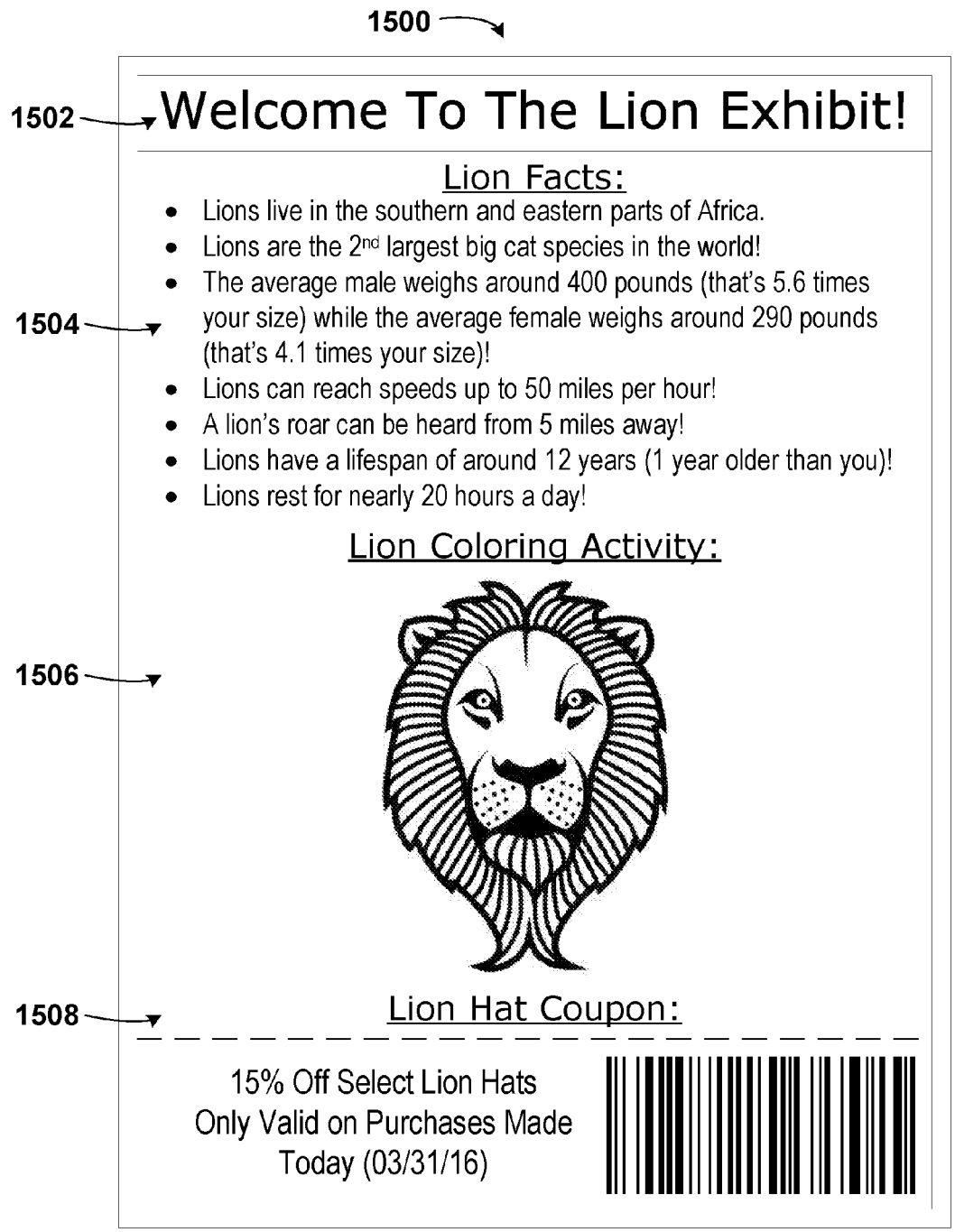
FIG. 15 is an illustration of a customized printed page, according to example embodiments.

FIG. 15 is an illustration of a customized print page 1500, according to example embodiments. The customized print page 1500 may be printed by one of the printers 206 at one of the geographic locations denoted by one of the proximity beacons 102 or one of the GPS locations 104. The customized print page 1500 may include a customized print page title 1502, location-specific information 1504, a location-specific activity 1506, and a location-specific advertisement 1508.

The customized print page title 1502 may indicate to a viewer what the printed page displays. The customized print page title 1502 may include more information, in some embodiments, such as when it was printed, which of the printers 206 performed the printing, where the printer 206 was located that performed the printing in relation to geographic locations, and the user profile and/or geographic location for which the customized print page 1500 was generated.

The location-specific information 1504 may provide facts based on information retrieved from the places database 232 or the geographic location database 252. The location-specific information 1504 may also contain information retrieved from the user profile database 262. Additionally or alternatively, the location-specific information 1504 may be displayed in such a way to most effectively communicate with the user for whom the customized print page 1500 was generated. For example, as in the embodiment of FIG. 15, the "lion facts" may have been retrieved from the places database 232, and the information about the lion may be discussed in comparison with information retrieved from the user profile database 232 (e.g. "lions have a lifespan of around 12 years (1 year older than you)).

The location-specific activity 1506 may provide additional customized print data on the customized print page 1500 based on information retrieved from the places database 232, the geographic location database 252, and/or the user profile database 262. As contrasting examples with the example embodiment of FIG. 6, if the associated user for whom the customized print page 1500 was generated were 40 years old, rather than 11 years old as in the example, the location-specific activity 1506 may have been a donation request for an international fund that aids in the protection of lion habitats. Additionally, if the associated geographic location were the penguin exhibit, rather than the lion exhibit, the "coloring activity" may have depicted a penguin rather than a lion.

The location-specific advertisement 1508 may provide additional customized print data on the customized print page 1500 based on information retrieved from the places database 232, the geographic location database 252, and/or the user profile database 262. In the example embodiment of FIG. 15, for example, a coupon is included to incite the user for whom the customized print page 1500 was generated to visit the gift shop.

III. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:
1. A system, comprising:
a multifunctional product;
a proximity beacon;
a server on a network and having access to a database,
wherein the database includes location data associated with the proximity beacon, and
wherein the location data includes a location-based artifact; and
a mobile client device having access to the network and associated with a user profile,
wherein the mobile client device has instructions stored thereon to cause the mobile client device to communicate with the multifunctional product and the server,
wherein the mobile client device is configured to determine when the mobile client device is within a threshold distance of the proximity beacon,
wherein, when the mobile client device determines that the mobile client device has been within a first threshold distance of the proximity beacon, the server and the mobile client device cooperatively provide print data,
wherein the print data:
is based on the location-based artifact and the user profile,
includes a heat map that provides information regarding population densities within a venue,
is transmitted to the multifunctional product, and
is printed by the multifunctional product, and
wherein the heat map indicates alternate routes between locations on the heat map when common routes between locations on the heat map have high traffic levels.

2. The system of claim 1, wherein the mobile client device comprises a Global Positioning System (GPS) receiver, and wherein the instructions stored on the mobile client device further cause the mobile client device to determine GPS coordinates of the mobile client device.

3. The system of claim 2, wherein the mobile client device is configured to determine when the mobile client device is within a threshold distance of a geographic position corresponding to the proximity beacon by comparing the GPS coordinates of the mobile client device with GPS coordinates of the proximity beacon.

4. The system of claim 1, wherein the first threshold distance is defined by a geofence.

5. The system of claim 1,
wherein color is used to indicate traffic density on the heat map, and
wherein contour lines are drawn on the heat map to depict different traffic conditions.

6. The system of claim 1, wherein the mobile client device determining when the mobile client device has been within the first threshold distance of the proximity beacon comprises receiving a transmission corresponding to the proximity beacon.

7. The system of claim 1, wherein one or more of the one or more proximity beacons are Bluetooth® low energy (BLE) devices.

8. The system of claim 1, wherein proximity beacon continuously broadcasts identification information about the proximity beacon.

9. The system of claim 1, wherein the instructions further cause the mobile client device to display the heat map of the venue on a user interface.

10. The system of claim 1, wherein the user profile includes at least biographical information, user preferences, and tracking information.

11. The system of claim 10, wherein the biographical information includes age, occupation, or languages spoken.

12. The system of claim 1, wherein the instructions further cause the mobile client device to transmit an alert to the server indicating current coordinates within the venue of the mobile client device.

13. The system of claim 1, wherein the first threshold distance comprises at least three sub-threshold distances based on proximity, and wherein the print data reflects which of the at least three sub-threshold distances is occupied by the mobile client device.

14. The system of claim 1, wherein the print data comprises an image, a photo, or a menu.

15. The system of claim 1, wherein the instructions are stored on the mobile client device as a mobile device application (App).

16. The system of claim 1, wherein the instructions stored on the mobile client device further cause the mobile client device to display geographic positions of other mobile client devices on the network.

17. The system of claim 1, wherein the heat map comprises population indicators that identify population rank among all exhibits within the venue.

18. A method for providing customized, location-based content, comprising:
receiving a transmission from a mobile client device when the mobile client device determines that the mobile client device is within a first threshold distance of a proximity beacon,
wherein the mobile client device has access to a network and is associated with a user profile,
wherein the mobile client device has instructions stored thereon to cause the mobile client device to communicate with a server,
wherein the server is on the network and has access to a database,
wherein the database includes location data associated with the proximity beacon, and
wherein the location data associated with the proximity beacon includes a location-based artifact; and
providing the customized, location-based content by the mobile client device and the server, cooperatively, wherein the customized, location-based content:
  is based on the location-based artifact and the user profile,
  includes a heat map that provides information regarding population densities within a venue, and
  is printable by one or more multifunctional products, and
wherein the heat map indicates alternate routes between locations on the heat map when common routes between locations on the heat map have high traffic levels.

19. The method of claim 18, wherein the proximity beacon continuously broadcasts identification information about the proximity beacon.

20. A mobile client computing device, comprising:
a network interface configured to communicate with:
  a multifunctional product;
  a proximity beacon; and
  a server on a network that has access to a database,
    wherein the database includes location data associated with the proximity beacon, and
    wherein the location data includes a location-based artifact;
a memory with instructions stored thereon; and
a processing device, wherein when the processing device executes the instructions, the processing device causes the mobile client device to:
  communicate with the multifunctional product and the server; and
  determine when the mobile client device is within a first threshold distance of the proximity beacon,
wherein the server and the mobile client device cooperatively provide print data to the multifunctional product when the mobile client device determines that the mobile client device is within the first threshold distance,
wherein the print data:
  is based on the location-based artifact and the user profile,
  includes a heat map that provides information regarding population densities within a venue,
  is transmitted to the multifunctional product, and
  is printed by the multifunctional product, and
wherein the heat map indicates alternate routes between locations on the heat map when common routes between locations on the heat map have high traffic levels.

* * * * *